United States Patent
Chen et al.

(10) Patent No.: US 10,992,356 B2
(45) Date of Patent: *Apr. 27, 2021

(54) MAIN BLUETOOTH CIRCUIT OF MULTI-MEMBER BLUETOOTH DEVICE

(71) Applicant: Realtek Semiconductor Corp., Hsinchu (TW)

(72) Inventors: Yi-Cheng Chen, Hsinchu (TW); Kuan-Chung Huang, Taipei (TW); Chin-Wen Wang, Hsinchu County (TW); Pei-Yuan Hsieh, Hsinchu (TW); Hou Wei Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 46 days.

This patent is subject to a terminal disclaimer.

(21) Appl. No.: 16/381,799

(22) Filed: Apr. 11, 2019

(65) Prior Publication Data

US 2019/0319685 A1    Oct. 17, 2019

Related U.S. Application Data

(60) Provisional application No. 62/724,633, filed on Aug. 30, 2018.

(30) Foreign Application Priority Data

Apr. 13, 2018 (TW) ................................ 107112825
Mar. 15, 2019 (TW) ................................ 108108851

(51) Int. Cl.
*H04B 7/06*  (2006.01)
*H04B 17/309*  (2015.01)
(Continued)

(52) U.S. Cl.
CPC .......... *H04B 7/0608* (2013.01); *H04B 1/401* (2013.01); *H04B 17/309* (2015.01); *H04L 5/0055* (2013.01)

(58) Field of Classification Search
CPC .......... H04B 17/23; H04B 7/26; H04B 17/29; H04B 1/401; H04B 7/0413; H04B 7/0608;
(Continued)

(56) References Cited

U.S. PATENT DOCUMENTS 7,978,647 B2 *  7/2011  Anjum ................ H04W 92/02
                                                            370/328
8,768,252 B2    7/2014  Watson et al.
(Continued)

FOREIGN PATENT DOCUMENTS

CN    101836402 B    5/2013
CN    106535081 A    3/2017
(Continued)

OTHER PUBLICATIONS

Taiwanese Office Action and Search Report for Taiwanese Application No. 108108851, dated Jan. 8, 2020, with partial English translation.
(Continued)

*Primary Examiner* — Lana N Le
(74) *Attorney, Agent, or Firm* — Birch, Stewart, Kolasch & Birch LLP

(57) ABSTRACT

A main Bluetooth circuit of a multi-member Bluetooth device includes: a Bluetooth communication circuit; a data transmission circuit; and a control circuit arranged to operably conduct bidirectional packet transmission with a remote Bluetooth device through the Bluetooth communication circuit by utilizing a Bluetooth wireless transmission approach, and arranged to operably communicate data with
(Continued)

other devices through the data transmission circuit. During the period in which the Bluetooth communication circuit conducts packet transmission with the remote Bluetooth device, an auxiliary Bluetooth circuit of the multi-member Bluetooth device sniffs packets transmitted from the remote Bluetooth device. When the control circuit has detected that the auxiliary Bluetooth circuit missed packets transmitted from the remote Bluetooth device, the control circuit is further arranged to operably transmit missing packets of the auxiliary Bluetooth circuit to the auxiliary Bluetooth circuit through the data transmission circuit.

9 Claims, 7 Drawing Sheets

(51) Int. Cl.
*H04B 1/401* (2015.01)
*H04L 5/00* (2006.01)

(58) Field of Classification Search
CPC ......... H04B 5/00; H04W 4/70; H04W 88/02; H04W 12/47; H04W 4/20; H04W 76/15; H04W 36/03; H04W 12/03; H04W 12/068; H04W 12/08; H04W 12/122; H04W 36/18; H04W 4/02; H04W 4/08; H04W 4/80; H04W 52/0261; H04W 76/14; H04W 84/18; H04W 84/20; H04W 88/04
USPC ....................................................... 455/41.2
See application file for complete search history.

(56) References Cited

U.S. PATENT DOCUMENTS

| | | | |
|---|---|---|---|
| 9,020,437 B2 | 4/2015 | Watson et al. | |
| 9,621,987 B2 | 4/2017 | Watson et al. | |
| 9,788,117 B2 | 10/2017 | Watson et al. | |
| 9,839,041 B2* | 12/2017 | Tolentino | H04L 1/0001 |
| 10,022,614 B1* | 7/2018 | Tran | G16H 50/70 |
| 10,200,791 B1* | 2/2019 | Liu | H04W 4/80 |
| 10,805,782 B1* | 10/2020 | VijayaRaghavan | H04W 4/06 |
| 2011/0169654 A1 | 7/2011 | Ketari | |
| 2012/0058727 A1 | 3/2012 | Cook et al. | |
| 2013/0259010 A1* | 10/2013 | Jechoux | H04W 72/02 370/336 |
| 2015/0281877 A1* | 10/2015 | Walden | H04W 4/80 455/41.2 |
| 2015/0296020 A1* | 10/2015 | Granqvist | H04L 67/06 455/41.2 |
| 2015/0304770 A1* | 10/2015 | Watson | H04R 3/12 381/79 |
| 2016/0014547 A1* | 1/2016 | Yae | H04W 4/80 455/418 |
| 2016/0112825 A1 | 4/2016 | Miller | |
| 2017/0093613 A1 | 3/2017 | Albrecht et al. | |
| 2018/0077493 A1 | 3/2018 | Watson et al. | |
| 2018/0184234 A1* | 6/2018 | Chen | H04W 4/80 |
| 2019/0349252 A1* | 11/2019 | Hu | H04W 4/80 |

FOREIGN PATENT DOCUMENTS

| | | |
|---|---|---|
| CN | 107071618 A | 8/2017 |
| CN | 107894881 A | 4/2018 |
| JP | 2003-273883 A | 9/2003 |
| JP | 2004-15136 A | 1/2004 |
| JP | 2004-350010 A | 12/2004 |

OTHER PUBLICATIONS

Taiwanese Office Action and Search Report for Taiwanese Application No. 108108852, dated Jan. 7, 2020, with partial English translation.
U.S. Office Action for U.S. Appl. No. 16/381,656, dated Jan. 30, 2020.
U.S. Office Action for U.S. Appl. No. 16/381,814, dated Jan. 16, 2020.
Japanese Office Action dated Feb. 12, 2020 for Application No. 2019-077166, along with an English translation.
Japanese Office Action dated Feb. 18, 2020 for Application No. 2019-076259, along with an English translation.
Japanese Office Action dated Feb. 18, 2020 for Application No. 2019-076295, along with an English translation.
Japanese Office Action dated Feb. 4, 2020 tor Application No. 2019-076280, along with an English translation.
Korean Office Action, dated Jun. 2, 2020, for Korean Application No. 10-2019-0043166, along with an English translation.
Korean Office Action, dated May 26, 2020, for Korean Application No. 10-2019-0043163, along with an English translation.
Korean Office Action, dated May 28, 2020, for Korean Application No. 10-2019-0043180, along with an English translation.
Japanese Office Action for Japanese Application No. 2019-076280, dated Jul. 28, 2020, with English translation.
Taiwanese Office Action and Search Report for Taiwanese Application No. 108108850, dated Aug. 4, 2020, with English translation.
Japanese Office Action for Japanese Application No. 2019-077166, dated Oct. 20, 2020, with English translation.
Korean Office Action dated Oct. 21, 2019 for Application No. 10-2019-0043162, along with an English translation.
Taiwanese Office Action and Search Report dated Dec. 12, 2019, for Taiwanese Application No. 108108850, with partial English translation.
U.S. Office Action dated Dec. 27, 2019, for U.S. Appl. No. 16/381,906.

\* cited by examiner

MAIN BLUETOOTH CIRCUIT OF MULTI-MEMBER BLUETOOTH DEVICE

CROSS-REFERENCE TO RELATED APPLICATIONS

This application claims the benefit of priority to Patent Application No. 107112825, filed in Taiwan on Apr. 13, 2018; the entirety of which is incorporated herein by reference for all purposes.

This application claims the benefit of priority to Patent Application No. 108108851, filed in Taiwan on Mar. 15, 2019; the entirety of which is incorporated herein by reference for all purposes.

This application claims the benefit of priority to U.S. Provisional Application Ser. No. 62/724,633, filed on Aug. 30, 2018; the entirety of which is incorporated herein by reference for all purposes.

BACKGROUND

The disclosure generally relates to a Bluetooth device and, more particularly, to a main Bluetooth circuit of a multi-member Bluetooth device capable of avoiding signal interrupt.

A multi-member Bluetooth device is a Bluetooth device formed by multiple Bluetooth circuits cooperating with each other, such as, a pair of Bluetooth earphones, a group of Bluetooth speakers, or the like. When the multi-member Bluetooth device connects to other Bluetooth devices (hereinafter, the remote Bluetooth device), the remote Bluetooth device treats the multi-member Bluetooth device as a single Bluetooth device. In operations, conventional multi-member Bluetooth device appoints one of the member circuits to be a signal relay circuit, so that the signal relay circuit acts as a data communication bridge between the remote Bluetooth device and other member circuits.

In operations, the signal relay circuit's computing loading is higher than other member circuits, and thus the signal relay circuit typically has higher power consumption and generates more heats than other member circuits. When the signal relay circuit is difficult to continue acting as the data communication bridge between the remote Bluetooth device and other member circuits due to lack of power or other reasons, the conventional multi-member Bluetooth device would appoint another member circuit to be a new signal relay circuit, and the new signal relay circuit would reestablish a new Bluetooth connection with the remote Bluetooth device. After the new signal relay circuit reestablished the new Bluetooth connection, all of the member circuits in the multi-member Bluetooth device then communicate data with the remote Bluetooth device through the new signal relay circuit.

However, before the new Bluetooth connection between the new signal relay circuit and the remote Bluetooth device is established, other member circuits may be unable to communicate data with the remote Bluetooth device for a while and thus encounter signal interruption problem. For example, in the application scenario of the Bluetooth earphones, one of the Bluetooth earphones may encounter audio interruption under such situation, thereby causing poor experiences to the user.

SUMMARY

An example embodiment of a main Bluetooth circuit of a multi-member Bluetooth device is disclosed. The multi-member Bluetooth device is utilized for communicating data with a remote Bluetooth device and comprises the main Bluetooth circuit and an auxiliary Bluetooth circuit. The main Bluetooth circuit comprises: a Bluetooth communication circuit; a data transmission circuit; and a control circuit arranged to operably conduct a bidirectional packet transmission with the remote Bluetooth device through the Bluetooth communication circuit by utilizing a Bluetooth wireless transmission approach, and arranged to operably communicate data with other devices through the data transmission circuit; wherein when the Bluetooth communication circuit conducts the bidirectional packet transmission with the remote Bluetooth device, the auxiliary Bluetooth circuit sniffs packets issued from the remote Bluetooth device; and when the control circuit has detected that the auxiliary Bluetooth circuit has missed packets issued from the remote Bluetooth device, the control circuit is further arranged to operably transmit missing packets of the auxiliary Bluetooth circuit to the auxiliary Bluetooth circuit through the data transmission circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
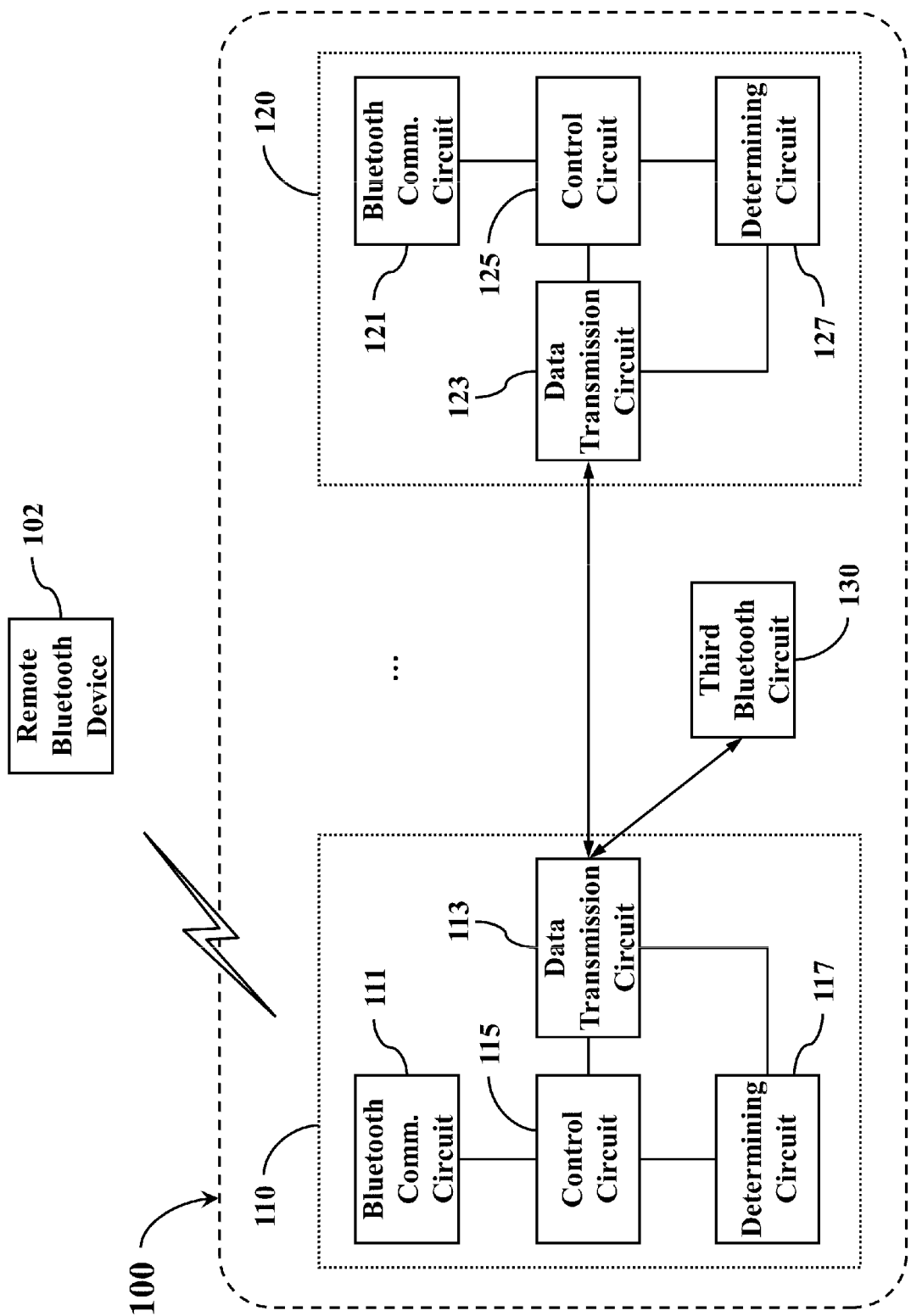
FIG. 1 shows a simplified functional block diagram of a multi-member Bluetooth device according to one embodiment of the present disclosure.

FIG. 1 shows a simplified functional block diagram of a multi-member Bluetooth device 100 according to one embodiment of the present disclosure. The multi-member Bluetooth device 100 is arranged to operably conduct data transmission with a remote Bluetooth device 102 and comprises multiple member circuits. For the purpose of explanatory convenience in the following description, only a first Bluetooth circuit 110, a second Bluetooth circuit 120, and a third Bluetooth circuit 130 are shown in the embodiment of FIG. 1.

In this embodiment, all of the member circuits in the multi-member Bluetooth device 100 have a similar main circuit structure, but different member circuits may be provided with different additional circuit components. That is, it does not require all member circuits to have completely identical circuitry structure with each other. For example, as shown in FIG. 1, the first Bluetooth circuit 110 comprises a Bluetooth communication circuit 111, a data transmission circuit 113, a control circuit 115, and a determining circuit 117. Similarly, the second Bluetooth circuit 120 comprises a Bluetooth communication circuit 121, a data transmission circuit 123, a control circuit 125, and a determining circuit 127.

The main circuit structure of the Bluetooth circuit 130 is similar to the aforementioned Bluetooth circuit 110 or 120, but for the sake of brevity, the circuitry components inside the Bluetooth circuit 130 are not shown in FIG. 1.

In the first Bluetooth circuit 110, the Bluetooth communication circuit 111 is arranged to operably communicate data with other Bluetooth devices. The data transmission circuit 113 is arranged to operably communicate data with other member circuits.

The control circuit 115 is coupled with the Bluetooth communication circuit 111 and the data transmission circuit 113. The control circuit 115 is arranged to operably communicate data with the remote Bluetooth device 102 through the Bluetooth communication circuit 111 by utilizing a Bluetooth wireless transmission approach, and arranged to operably communicate data with other member circuits through the data transmission circuit 113.

The determining circuit 117 is coupled with the control circuit 115. The determining circuit 117 is arranged to operably evaluate a computing loading, a remaining power, a temperature, or an operating environment of the first Bluetooth circuit 110, and arranged to operably notify the control circuit 115 when the above operating parameters of the first Bluetooth circuit 110 match predetermined conditions.

In some embodiments, the determining circuit 117 is further coupled with the data transmission circuit 113 to receive indication messages regarding a computing loading, a remaining power, a temperature, or an operating environment of other member circuits transmitted from other member circuits (e.g., the Bluetooth circuit 120 or the Bluetooth circuit 130 in FIG. 1) through the data transmission circuit 113.

In the second Bluetooth circuit 120, the Bluetooth communication circuit 121 is arranged to operably communicate data with other Bluetooth devices. The data transmission circuit 123 is arranged to operably communicate data with other member circuits.

The control circuit 125 is coupled with the Bluetooth communication circuit 121 and the data transmission circuit 123. The control circuit 125 is arranged to operably communicate data with other Bluetooth devices through the Bluetooth communication circuit 121 by utilizing a Bluetooth wireless transmission approach, and arranged to operably communicate data with other member circuits through the data transmission circuit 123.

The determining circuit 127 is coupled with the control circuit 125. The determining circuit 127 is arranged to operably evaluate a computing loading, a remaining power, a temperature, or an operating environment of the second Bluetooth circuit 120, and arranged to operably notify the control circuit 125 when the above operating parameters of the second Bluetooth circuit 120 match predetermined conditions.

In some embodiments, the determining circuit 127 is further coupled with the data transmission circuit 123 to receive indication messages regarding a computing loading, a remaining power, a temperature, or an operating environment of other member circuits transmitted from other member circuits (e.g., the Bluetooth circuit 110 or 130 in FIG. 1) through the data transmission circuit 123.

In practice, each of the aforementioned Bluetooth communication circuits 111 and 121 may be realized with suitable communication circuits capable of supporting various versions of the Bluetooth communication protocols. Each of the aforementioned data transmission circuits 113 and 123 may be realized with a wired transmission circuit, a wireless transmission circuits or a hybrid circuit integrating above two transmission mechanisms. Each of the aforementioned control circuits 115 and 125 may be realized with various microprocessors or digital signal processing circuits having appropriate computing abilities. Each of the aforementioned determining circuits 117 and 127 may be realized with appropriate circuits capable of sensing, collecting, recording, and comparing related operating parameters.

In some embodiments, the determining circuit 117 or 127 may be integrated into the control circuit 115 or 125. In addition, the data transmission circuits 113 and 123 may be respectively integrated into the Bluetooth communication circuits 111 and 121. Alternatively, the Bluetooth communication circuits 111 and 121 may be respectively utilized to realize the functionalities of the data transmission circuits 113 and 123.

In other words, the Bluetooth communication circuit 111 and the data transmission circuit 113 may be realized with separate circuits, or may be integrated into a single circuit. Similarly, the Bluetooth communication circuit 121 and the data transmission circuit 123 may be realized with separate circuits, or may be integrated into a single circuit.

In practical applications, different functional blocks of the aforementioned first Bluetooth circuit 110 may be integrated into a single circuit chip. For example, all functional blocks of the first Bluetooth circuit 110 may be integrated into a single Bluetooth controller IC. Similarly, all functional blocks of the second Bluetooth circuit 120 may be integrated into another Bluetooth controller IC.

As can be appreciated from the foregoing descriptions that different member circuits of the multi-member Bluetooth device 100 may communicate data with each other through respective data transmission circuit by using various wired or wireless transmission mechanisms, so as to form various types of data network or data link. When the multi-member Bluetooth device 100 communicates data with the remote Bluetooth device 102, only a particular member circuit out of the multiple member circuits of the multi-member Bluetooth device 100 is responsible for directly communicating data with the remote Bluetooth device 102, while other member circuits indirectly communicate data with the remote Bluetooth device 102 through the particular member circuit. Therefore, the remote Bluetooth device 102 would treat the multi-member Bluetooth device 100 as a single Bluetooth device.

Figure 2:
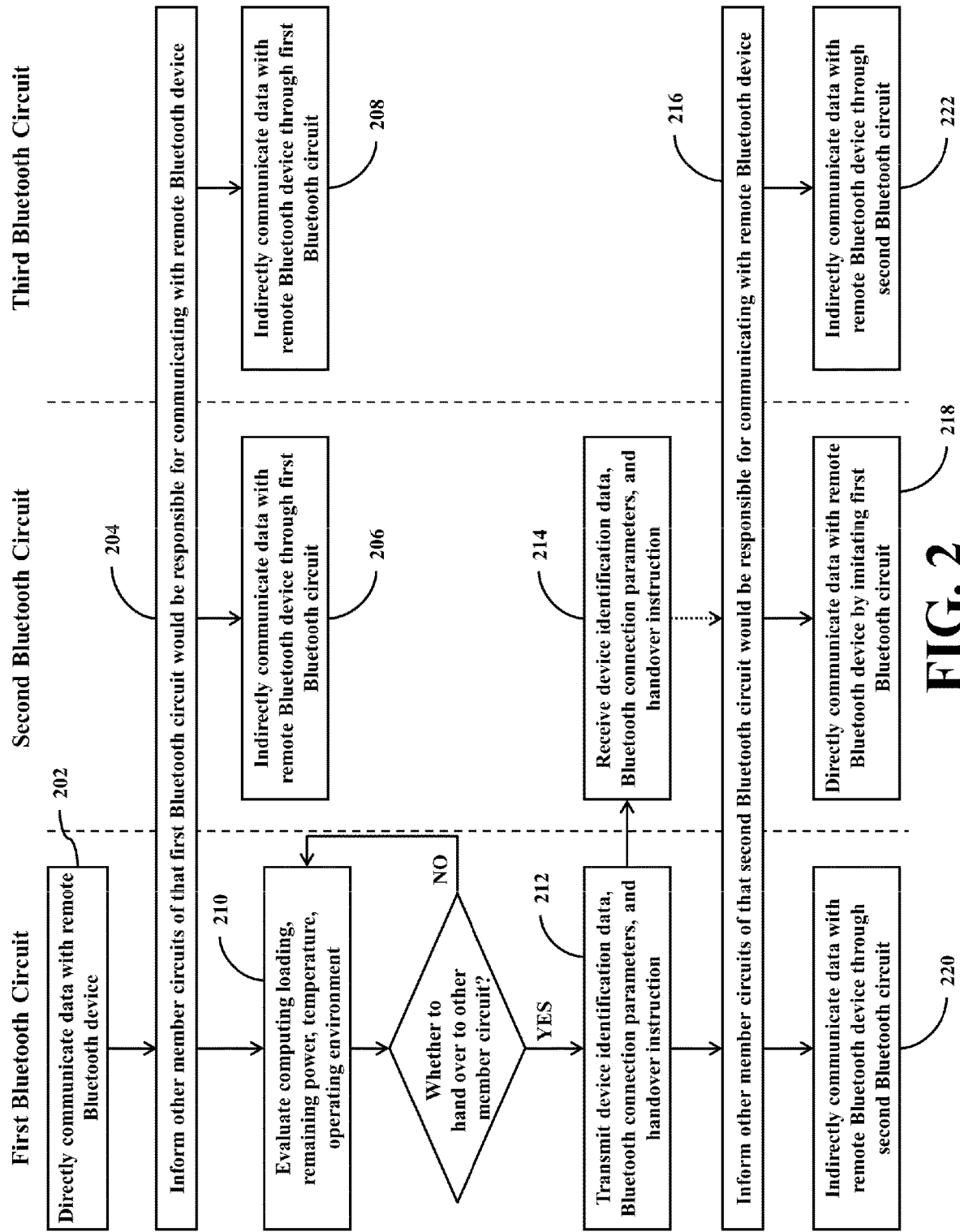
FIG. 2 shows a simplified flowchart illustrating a method of seamless handover between different member circuits of the multi-member Bluetooth device according to the present disclosure.
Figure 3:
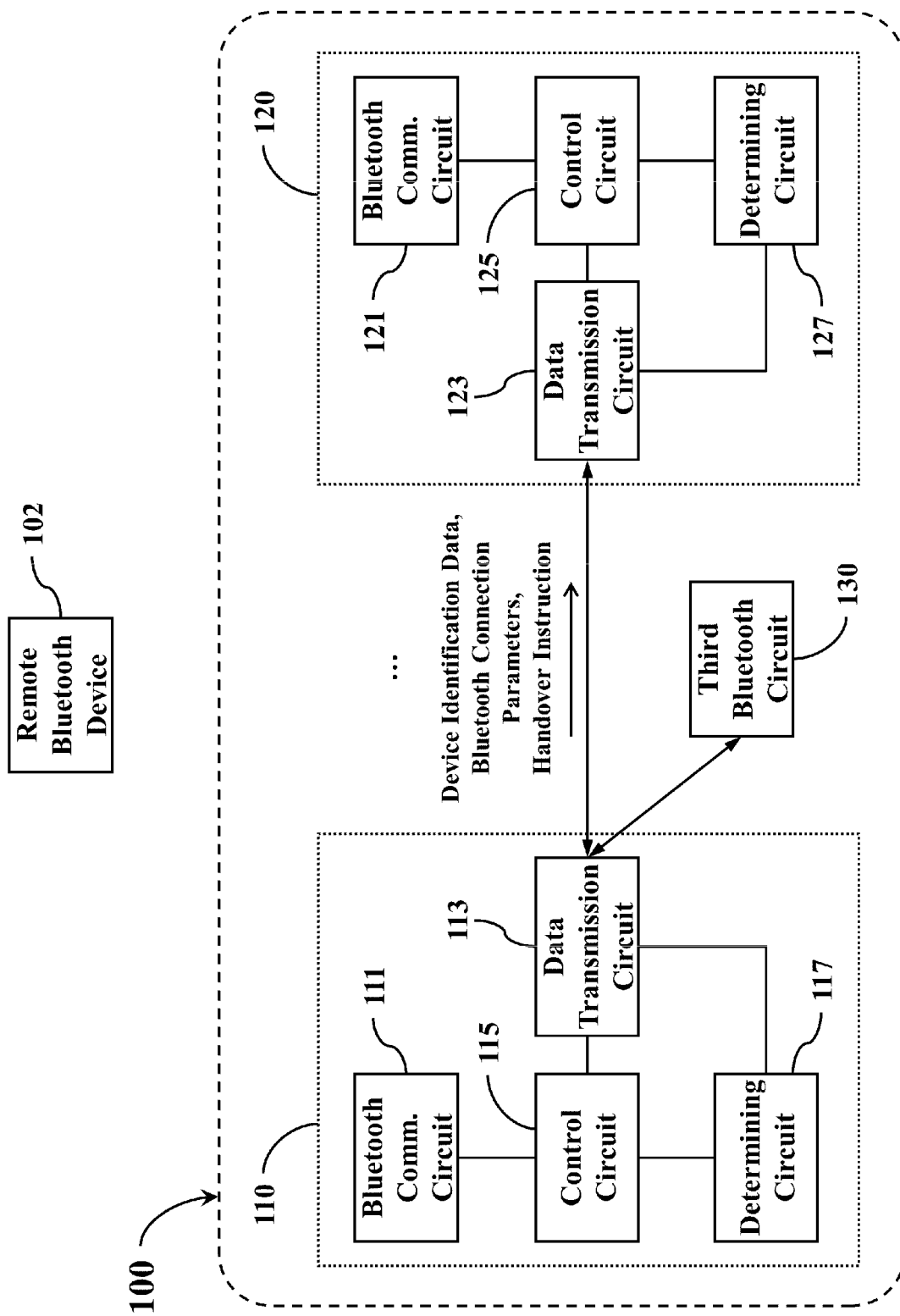
FIG. 3 and FIG. 4 show simplified schematic diagrams of the operation of the multi-member Bluetooth device of FIG. 1 in different operation stages.
Figure 4:
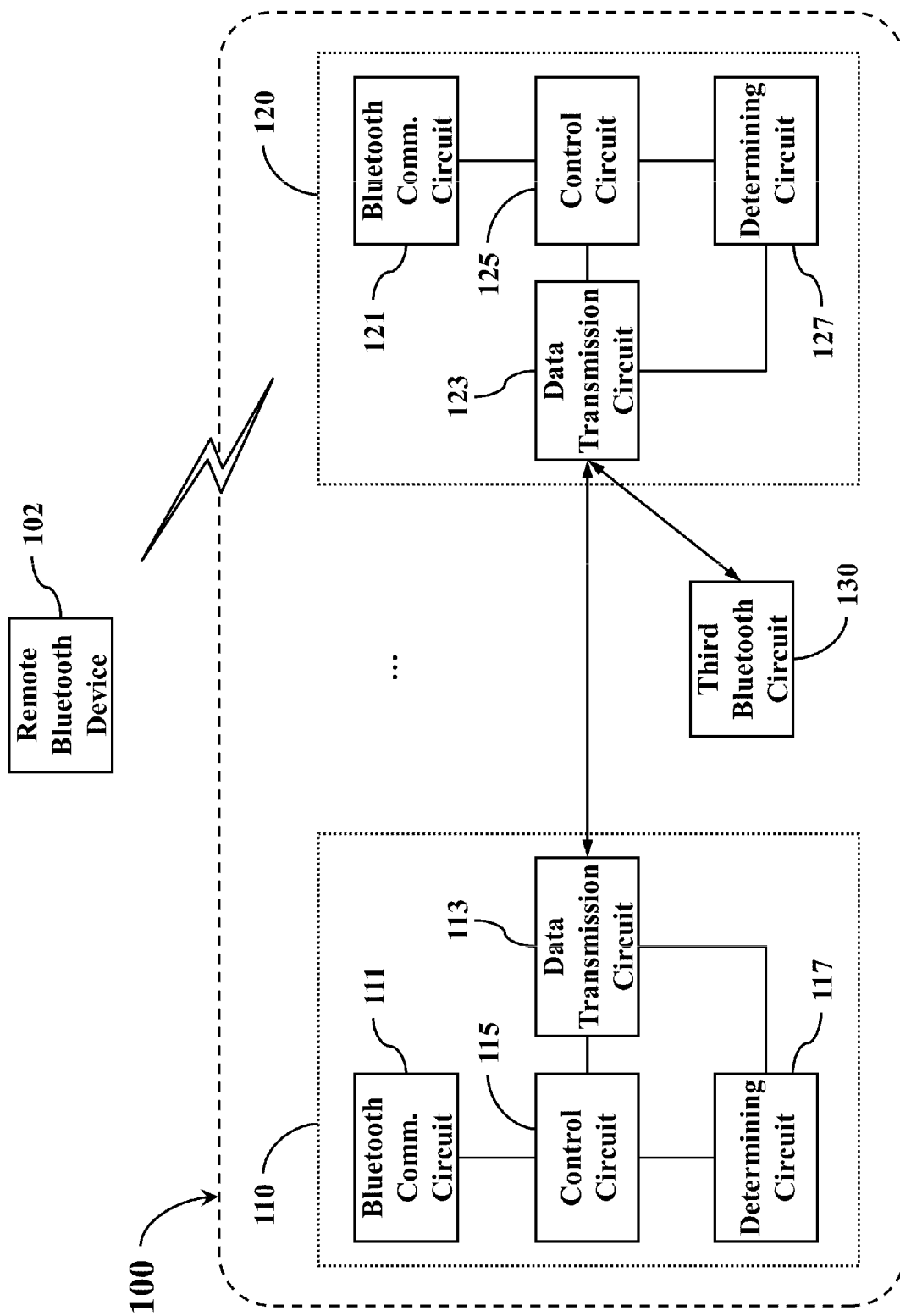

The operations of the multi-member Bluetooth device 100 will be further described below with reference to FIG. 2 to FIG. 4. FIG. 2 shows a simplified flowchart illustrating a method of seamless handover between different member circuits of the multi-member Bluetooth device 100 according to the present disclosure. FIG. 3 and FIG. 4 show simplified schematic diagrams of the operation of the multi-member Bluetooth device 100 in different operation stages.

In the flowchart shown in FIG. 2, operations within a column under the name of a specific device are operations to be performed by the specific device. For example, operations within a column under the label "first Bluetooth circuit" are operations to be performed by the first Bluetooth circuit 110; operations within a column under the label "second Bluetooth circuit" are operations to be performed by the second Bluetooth circuit 120; operations within a column under the label "third Bluetooth circuit" are operations to be performed by the third Bluetooth circuit 130.

For the purpose of explanatory convenience in the following description, it is assumed hereinafter that the member circuit preselected from the multi-member Bluetooth device 100 to be responsible for conducting Bluetooth communication with external Bluetooth devices is the first Bluetooth circuit 110.

In the operation 202, the first Bluetooth circuit 110 directly communicates data with the remote Bluetooth device 102 as shown in FIG. 1. For example, the control circuit 115 may control the Bluetooth communication circuit 111 to establish a Bluetooth connection with the remote Bluetooth device 102 in the operation 202 so as to directly conduct a bidirectional data communication with the remote Bluetooth device 102. For another example, the control circuit 115 may control the Bluetooth communication circuit 111 to operate in the advertising mode to unidirectionally transmit data to the remote Bluetooth device 102 in the operation 202. For yet another example, the control circuit 115 may control the Bluetooth communication circuit 111 to operate in an appropriate Bluetooth packet receiving mode to unidirectionally receive data transmitted from the remote Bluetooth device 102 in the operation 202.

In other words, the data communication between the first Bluetooth circuit 110 and the remote Bluetooth device 102 may be bidirectional, or may be unidirectional.

In the operation 204, the first Bluetooth circuit 110 informs other member circuits of the multi-member Bluetooth device 100 of that the first Bluetooth circuit 110 would be responsible for communicating with the remote Bluetooth device 102. That is, the first Bluetooth circuit 110 would act as the data communication bridge between the remote Bluetooth device 102 and other member circuits in the subsequent operations. In the operation 204, the control circuit 115 may transmit related notification message to data transmission circuits of other member circuits through the data transmission circuit 123.

Afterwards, the second Bluetooth circuit 120 performs the operation 206 when the second Bluetooth circuit 120 needs to receive data transmitted from the remote Bluetooth device 102 or needs to transmit data to the remote Bluetooth device 102. Similarly, the third Bluetooth circuit 130 performs the operation 208 when the third Bluetooth circuit 130 needs to receive data transmitted from the remote Bluetooth device 102, or needs to transmit data to the remote Bluetooth device 102.

In the operation 206, the second Bluetooth circuit 120 indirectly communicates data with the remote Bluetooth device 102 through the first Bluetooth circuit 110. For example, the control circuit 125 of the second Bluetooth circuit 120 may transmit a data to be transmitted to the remote Bluetooth device 102 to the data transmission circuit 113 of the first Bluetooth circuit 110 through the data transmission circuit 123, and then the first Bluetooth circuit 110 would forward the data to the remote Bluetooth device 102. For another example, the control circuit 125 of the second Bluetooth circuit 120 may receive a data transmitted from the remote Bluetooth device 102 through the first Bluetooth circuit 110.

In the operation 208, the third Bluetooth circuit 130 indirectly communicates data with the remote Bluetooth device 102 through the first Bluetooth circuit 110. For example, the third Bluetooth circuit 130 may transmit a data to be transmitted to the remote Bluetooth device 102 to the data transmission circuit 113 of the first Bluetooth circuit 110, and then the first Bluetooth circuit 110 would forward the data to the remote Bluetooth device 102. For another example, the third Bluetooth circuit 130 may receive a data transmitted from the remote Bluetooth device 102 through the first Bluetooth circuit 110.

As a result, during the operation of the multi-member Bluetooth device 100, the first Bluetooth circuit 110 is the only member circuit that directly communicates data with the remote Bluetooth device 102, and each of the other member circuits would indirectly communicate data with the remote Bluetooth device 102 through the first Bluetooth circuit 110. In other words, the first Bluetooth circuit 110 acts as a signal relay device between other member circuits and the remote Bluetooth device 102 at this time.

In the environment where all member circuits of the multi-member Bluetooth device 100 are battery-powered circuits, the aforementioned mechanism reduces the computing loading, power consumption, and heat generation of other member circuits.

During the operation of the multi-member Bluetooth device 100, the determining circuit 117 of the first Bluetooth circuit 110 may periodically or intermittently perform the operation 210.

In the operation 210, the determining circuit 117 evaluates the operating parameters (such as a computing loading, a remaining power, a temperature, and/or an operating environment) of the first Bluetooth circuit 110 to determine whether the first Bluetooth circuit 110 needs to hand over its role of signal relay device to other member circuits. If the determining circuit 117 determines that a current situation of the first Bluetooth circuit 110 matches predetermined conditions, then the first Bluetooth circuit 110 performs the operation 212. Otherwise, the determining circuit 117 continues repeating the operation 210 periodically or intermittently.

For example, the determining circuit 117 may determine that the first Bluetooth circuit 110 needs to hand over the role of signal relay device to other member circuits only in the case that the computing loading of the first Bluetooth circuit 110 exceeds a predetermined level, the remaining power of the first Bluetooth circuit 110 is below a predetermined level, the temperature of the first Bluetooth circuit 110 exceeds a predetermined temperature, and the operating environment of the first Bluetooth circuit 110 deviates from a predetermined condition. In some embodiments where the first Bluetooth circuit 110 is a Bluetooth earphone, the predetermined condition of the operating environment of the first Bluetooth circuit 110 is that the first Bluetooth circuit 110 should operate inside the external auditory canal of the user. In this situation, the determining circuit 117 may determine that the operating environment of the first Bluetooth circuit 110 deviates from predetermined conditions when the determining circuit 117 has sensed that the position of the first Bluetooth circuit 110 leaves the user's ear.

For another example, the determining circuit 117 may determine that the first Bluetooth circuit 110 needs to hand over the role of signal relay device to other member circuits when the first Bluetooth circuit 110 matches at least one of the above conditions.

In another embodiment, the determining circuit 117 may receive indication messages of other member circuit's operating parameters (such as the computing loading, the remaining power, the temperature, or the operating environment) transmitted from other member circuits (e.g., the Bluetooth circuit 120 and 130 in FIG. 1) through the data transmission circuit 113 in the operation 210. The determining circuit 117 may compare the operating parameters of the first Bluetooth circuit 110 with corresponding operating parameters of other member circuits, and utilize the comparing result as a reference basis of determining whether the first Bluetooth circuit 110 needs to hand over the role of signal relay device to other member circuits. In this embodiment, other member circuits may utilize their determining circuit to evaluate their own operating parameters, such as the computing loading, the remaining power, the temperature, and/or the operating environment, and transmit the obtained operating parameters to the determining circuit 117 of the first Bluetooth circuit 110 in the operation 210.

For example, the determining circuit 117 may determine that the first Bluetooth circuit 110 needs to hand over the role of signal relay device to other member circuits only in the case that the computing loading of the first Bluetooth circuit 110 exceeds the computing loading of other member circuit to a predetermined degree, the remaining power of the first Bluetooth circuit 110 is below the remaining power of other member circuit to a predetermined degree, the temperature of the first Bluetooth circuit 110 exceeds the temperature of other member circuit to a predetermined degree, and the operating environment of the first Bluetooth circuit 110 deviates from corresponding predetermined conditions but the operating environment of other member circuit matches corresponding predetermined conditions.

For another example, the determining circuit 117 may determine that the first Bluetooth circuit 110 needs to hand over the role of signal relay device to other member circuits when the first Bluetooth circuit 110 matches at least one of the above conditions.

In practice, the determining circuit 117 may take both the aforementioned operating parameters of the first Bluetooth circuit 110 and the difference between operating parameters of the first Bluetooth circuit 110 and corresponding operating parameters of other member circuits into consideration in the aforementioned operation 210.

For example, the determining circuit 117 may determine that the first Bluetooth circuit 110 needs to hand over the role of signal relay device to other member circuits only in the case that the computing loading of the first Bluetooth circuit 110 exceeds a predetermined level, the remaining power of the first Bluetooth circuit 110 is below a predetermined level, the temperature of the first Bluetooth circuit 110 exceeds a predetermined temperature, the computing loading of the first Bluetooth circuit 110 exceeds the computing loading of other member circuit to a predetermined degree, the remaining power of the first Bluetooth circuit 110 is below the remaining power of other member circuit to a predetermined degree, the temperature of the first Bluetooth circuit 110 exceeds the temperature of other member circuit to a predetermined degree, and the operating environment of the first Bluetooth circuit 110 deviates from corresponding predetermined conditions but the operating environment of other member circuit matches corresponding predetermined conditions Alternatively, the determining circuit 117 may determine that the first Bluetooth circuit 110 needs to hand over the role of signal relay device to other member circuits when the first Bluetooth circuit 110 matches at least a portion of the above conditions.

When the determining circuit 117 determines that the first Bluetooth circuit 110 needs to hand over the role of signal relay device to other member circuits, the determining circuit 117 notifies the control circuit 115 so that the control circuit 115 performs the operation 212.

In the operation 212, the control circuit 115 may select one member circuit from other member circuits of the multi-member Bluetooth device 100 to play the role of signal relay device in the subsequent operation, and transmit a device identification data of the first Bluetooth circuit 110, the Bluetooth connection parameters between the first Bluetooth circuit 110 and the remote Bluetooth device 102, and a handover instruction to the selected member circuit through the data transmission circuit 113.

In practice, the control circuit 115 may select any member circuit from other member circuits of the multi-member Bluetooth device 100 to play the role of signal relay device in the subsequent operation.

Alternatively, the control circuit 115 may select a member circuit having the greatest operating parameters from other member circuits of the multi-member Bluetooth device 100 to play the role of signal relay device in the subsequent operation.

For example, the control circuit 115 may select a member circuit having the highest remaining power from other member circuits of the multi-member Bluetooth device 100 to play the role of signal relay device in the subsequent operation.

For another example, the control circuit 115 may select a member circuit having the lowest average computing loading from other member circuits of the multi-member Bluetooth device 100 to play the role of signal relay device in the subsequent operation.

For yet another example, the control circuit 115 may select a member circuit having the lowest temperature from other member circuits of the multi-member Bluetooth device 100 to play the role of signal relay device in the subsequent operation.

For yet another example, the control circuit 115 may respectively set an appropriate weight for multiple operating parameters of other member circuits, and select a member circuit having the highest weighted score to play the role of signal relay device in the subsequent operation.

For the purpose of explanatory convenience in the following description, it is assumed hereinafter that the control circuit 115 selects the second Bluetooth circuit 120 to play the role of signal relay device in the subsequent operation in the aforementioned operation 212.

Therefore, as shown in FIG. 3, the control circuit 115 transmits the device identification data of the first Bluetooth circuit 110, the Bluetooth connection parameters between the first Bluetooth circuit 110 and the remote Bluetooth device 102, and the handover instruction to the second Bluetooth circuit 120 through the data transmission circuit 113 and the data transmission circuit 123 in the operation 212.

The handover instruction is utilized for instructing the second Bluetooth circuit 120 to directly communicate data with the remote Bluetooth device 102 by imitating the first Bluetooth circuit 110 utilizing the device identification data of the first Bluetooth circuit 110 and the Bluetooth connection parameters of the first Bluetooth circuit 110. That is, the handover instruction is utilized for instructing the second Bluetooth circuit 120 to replace the first Bluetooth circuit 110 by utilizing the device identification data of the first Bluetooth circuit 110 and the Bluetooth connection parameters of the first Bluetooth circuit 110 to directly communicate data with the remote Bluetooth device 102 utilizing a Bluetooth wireless transmission approach, so as to take over the role of signal relay device in the subsequent operation.

In practice, the device identification data of the first Bluetooth circuit 110 transmitted in the aforementioned operation 212 may vary with the version of Bluetooth communication protocols employed between the multi-member Bluetooth device 100 and the remote Bluetooth device 102, or may vary with the Bluetooth communication mode adopted at that time.

For example, in one embodiment, the device identification data of the first Bluetooth circuit 110 comprises a sync word utilized by the first Bluetooth circuit 110, a Bluetooth address of the first Bluetooth circuit 110, and a logical transport address (LT_ADDR) of the first Bluetooth circuit 110.

In another embodiment, the device identification data of the first Bluetooth circuit 110 comprises an access address of the first Bluetooth circuit 110.

In yet another embodiment, the device identification data of the first Bluetooth circuit 110 comprises an access address of the first Bluetooth circuit 110 and an advertising device address of the first Bluetooth circuit 110.

Similarly, the Bluetooth connection parameters transmitted in the aforementioned operation 212 may vary with the version of Bluetooth communication protocols employed between the multi-member Bluetooth device 100 and the remote Bluetooth device 102, or may vary with the Bluetooth communication mode adopted at that time.

For example, in one embodiment, the Bluetooth connection parameters between the first Bluetooth circuit 110 and the remote Bluetooth device 102 comprises a piconet clock and an adaptive frequency hopping map (AFH map).

In another embodiment, the Bluetooth connection parameters between the first Bluetooth circuit 110 and the remote Bluetooth device 102 comprises a piconet clock, an AFH map, a link key, and an encryption key.

In yet another embodiment, the Bluetooth connection parameters between the first Bluetooth circuit 110 and the remote Bluetooth device 102 comprises an advertising interval, a channel map, and a vendor specific timing data.

In yet another embodiment, the Bluetooth connection parameters between the first Bluetooth circuit 110 and the remote Bluetooth device 102 comprises an anchor point instant, a connection counter, a connection interval, a channel map, a long term key, a session key, an initialization vector, a CCM counter, and a vendor specific timing data.

In the operation 214, the control circuit 125 of the second Bluetooth circuit 120 receives the device identification data, the Bluetooth connection parameters, and the handover instruction transmitted from the first Bluetooth circuit 110 through the data transmission circuit 123.

In the operation 216, the first Bluetooth circuit 110 or the second Bluetooth circuit 120 informs other member circuits of the multi-member Bluetooth device 100 of that the second Bluetooth circuit 120 will be responsible for communicating with the remote Bluetooth device 102 in the subsequent operation. That is, the second Bluetooth circuit 120 would act as the data communication bridge between the remote Bluetooth device 102 and other member circuits in the following operation. In the operation 216, the control circuit 115 or 125 may transmit the above notification to the data transmission circuits of other member circuits through corresponding data transmission circuits.

In the operation 218, as shown in FIG. 4, the control circuit 125 of the second Bluetooth circuit 120 controls the Bluetooth communication circuit 121 to directly communicate data with the remote Bluetooth device 102 by imitating the first Bluetooth circuit 110 utilizing the device identification data and the Bluetooth connection parameters of the first Bluetooth circuit 110. Please note that "imitating" the first Bluetooth circuit 110 means that when the second Bluetooth circuit 120 directly conducts Bluetooth communication with the remote Bluetooth device 102, the second Bluetooth circuit 120 utilizes the device identification data of the first Bluetooth circuit 110 as the device identification data of the second Bluetooth circuit 120 on purpose, to thereby render the remote Bluetooth device 102 to believe that the remote Bluetooth device 102 is still conducting Bluetooth communication with the first Bluetooth circuit 110.

On the other hand, when the Bluetooth communication circuit 121 of the second Bluetooth circuit 120 directly communicates data with the remote Bluetooth device 102 in the name of the first Bluetooth circuit 110, the control circuit 115 of the first Bluetooth circuit 110 would control the Bluetooth communication circuit 111 to stop communicating data with the remote Bluetooth device 102 utilizing a Bluetooth wireless transmission approach, so as to avoid the remote Bluetooth device 102 from signal confusion.

In other words, during a period in which the first Bluetooth circuit 110 directly communicates data with the remote Bluetooth device 102 utilizing the Bluetooth communication circuit 111, the Bluetooth communication circuit 121 of the second Bluetooth circuit 120 does not directly communicate data with the remote Bluetooth device 102; while during a period in which the Bluetooth communication circuit 121 of the second Bluetooth circuit 120 directly communicate data with the remote Bluetooth device 102, the Bluetooth communication circuit 111 of the first Bluetooth circuit 110 does not directly communicate data with the remote Bluetooth device 102.

Furthermore, the Bluetooth communication circuit 121 does not need to ask for a permission from the remote Bluetooth device 102 before it directly communicates data with the remote Bluetooth device 102 utilizing a Bluetooth wireless transmission approach in the name of the first Bluetooth circuit 110 by utilizing a device identification data and multiple Bluetooth connection parameters. Therefore, when the second Bluetooth circuit 120 begins to directly conduct Bluetooth communication with the remote Bluetooth device 102, the remote Bluetooth device 102 does not ask the second Bluetooth circuit 120 to reestablish a Bluetooth connection with the remote Bluetooth device 102.

In other words, since the second Bluetooth circuit 120 directly conducts the Bluetooth communication with the remote Bluetooth device 102 by utilizing the device identification data and the Bluetooth connection parameters of the first Bluetooth circuit 110, the second Bluetooth circuit 120 does not need to spend time reestablishing a Bluetooth connection with the remote Bluetooth device 102. For another aspect, the foregoing approach can effectively prevent the second Bluetooth circuit 120 from signal interruption caused by reestablishing Bluetooth connection with the remote Bluetooth device 102 in the name of the second Bluetooth circuit 120.

Afterwards, the first Bluetooth circuit 110 performs the operation 220 when the first Bluetooth circuit 110 needs to receive a data transmitted from the remote Bluetooth device 102 or needs to transmit a data to the remote Bluetooth device 102. Similarly, the third Bluetooth circuit 130 performs the operation 222 when the third Bluetooth circuit 130 needs to receive a data transmitted from the remote Bluetooth device 102 or needs to transmit a data to the remote Bluetooth device 102.

In the operation 220, the first Bluetooth circuit 110 instead indirectly communicates data with the remote Bluetooth device 102 through the second Bluetooth circuit 120. For example, the control circuit 115 of the first Bluetooth circuit 110 may transmit a data to be transmitted to the remote Bluetooth device 102 to the data transmission circuit 123 of the second Bluetooth circuit 120 through the data transmission circuit 113, and then the second Bluetooth circuit 120 would forward the data to the remote Bluetooth device 102. For another example, the control circuit 115 of the first Bluetooth circuit 110 may receive a data transmitted from the remote Bluetooth device 102 through the second Bluetooth circuit 120.

In the operation 222, the third Bluetooth circuit 130 indirectly communicates data with the remote Bluetooth device 102 through the second Bluetooth circuit 120. For example, the third Bluetooth circuit 130 may transmit a data to be transmitted to the remote Bluetooth device 102 to the data transmission circuit 123 of the second Bluetooth circuit 120, and then the second Bluetooth circuit 120 would forward the data to the remote Bluetooth device 102. For another example, the third Bluetooth circuit 130 may receive a data transmitted from the remote Bluetooth device 102 through the second Bluetooth circuit 120.

As a result, during the subsequent operation of the multi-member Bluetooth device 100, the second Bluetooth circuit 120 is the only member circuit that directly communicates data with the remote Bluetooth device 102, while each of the other member circuits would instead indirectly communicate data with the remote Bluetooth device 102 through the second Bluetooth circuit 120. In other words, the second Bluetooth circuit 120 replaces the first Bluetooth circuit 110 to act as the signal relay device between other member circuits and the remote Bluetooth device 102 in this situation.

Please note that the executing order of the operations in FIG. 2 is merely an example embodiment, rather than a restriction to the practical implementations. For example, the aforementioned operations of transmitting the device identification data of the first Bluetooth circuit 110, the Bluetooth connection parameters between the first Bluetooth circuit 110 and the remote Bluetooth device 102, and the handover instruction to the second Bluetooth circuit 120 are simultaneously performed in the operation 212, but the above data, parameters, and instruction may be separately transmitted at different points of time in practical applications.

In some embodiments or applications, the first Bluetooth circuit 110 may skip the determining operation of the operation 210 and directly proceed with the operation 212 when the first Bluetooth circuit 110 play the role of the signal relay device in order to achieve some specific application purposes. For example, when the first Bluetooth circuit 110 is about to enter into a specific operating mode (e.g., entering into a power saving mode, entering into a firmware auto-update mode, or going to reboot), the control circuit 115 may actively request one of the other member circuits (e.g., the second Bluetooth circuit 120) to replace the first Bluetooth circuit 110 for directly communicating data with the remote Bluetooth device 102, so as to take over the role of signal relay device. That is, the control circuit 115 is not restricted by the determining result made by the determining circuit 117 at that time. In this situation, the first Bluetooth circuit 110 equivalently skips the operation 210 and directly jump to the operation 212.

Furthermore, the quantity of the member circuits in the multi-member Bluetooth device 100 may be reduced to two, or may be increased depending on the requirement of practical circuit applications.

The architecture and operations of the disclosed multi-member Bluetooth device 100 may be applied to various devices or systems adopting the Bluetooth transmission mechanism, such as a pair of Bluetooth earphones, a group of Bluetooth speakers, a group of virtual reality devices, a group of Bluetooth tire-pressure sensors, an IoT (Internet of Things) system comprising multiple IoT unit circuits, or the like. The remote Bluetooth device 102 may be realized by various appropriate devices having the Bluetooth transmission capability, such as a desktop computer, a notebook computer, a tablet computer, a cell phone, a smart watch, a VR (virtual reality) image signal generating device, smart speakers, a smart television, a vehicle electronic device, an IoT transceiving circuit, or the like.

As can be appreciated from the foregoing descriptions that the first Bluetooth circuit 110 first plays the role of signal relay device in the multi-member Bluetooth device 100 to directly conducts Bluetooth communication with the remote Bluetooth device 102, and acts as a data communication bridge between the remote Bluetooth device 102 and other member circuits. After the first Bluetooth circuit 110 played the role of signal relay device for a period of time, the control circuit 115 of the first Bluetooth circuit 110 would instruct the second Bluetooth circuit 120 to play the role of signal relay device in the subsequent operation, and to replace the first Bluetooth circuit 110 by utilizing the device identification data and the Bluetooth connection parameters of the first Bluetooth circuit 110 so as to directly conduct Bluetooth communication with the remote Bluetooth device 102 in the name of the first Bluetooth circuit 110, to thereby act as the data communication bridge between the remote Bluetooth device 102 and other member circuits.

The aforementioned approach that the first Bluetooth circuit 110 hands over the role of signal relay device to the second Bluetooth circuit 120 can effectively reduce the computing loading, the power consumption, or the heat generation of the first Bluetooth circuit 110.

Additionally, by directly communicating data with the remote Bluetooth device 102 in the name of the first Bluetooth circuit 110, the second Bluetooth circuit 120 does not need to reestablish a new Bluetooth connection with the remote Bluetooth device 102, thereby effectively preventing the member circuits of the multi-member Bluetooth device 100 from encountering signal interruption.

In other words, the first Bluetooth circuit 110 is able to seamlessly hand over the role of signal relay device to the second Bluetooth circuit 120 by adopting the method of FIG. 2 without the need of asking for a permission from the remote Bluetooth device 102 in advance.

From another aspect, in the multi-member Bluetooth device 100, the member circuit currently acting as the signal relay device (hereinafter, referred to as a main Bluetooth circuit) may select another member circuit (hereinafter, referred to as an auxiliary Bluetooth circuit) at an appropriate point of time to play the role of signal relay device in the subsequent operation. In addition, the main Bluetooth circuit can also flexibly decide the timing at which the auxiliary Bluetooth circuit replaces the main Bluetooth circuit for directly conducting Bluetooth communication with the remote Bluetooth device 102.

Therefore, the multi-member Bluetooth device 100 is capable of achieving various management mechanisms, such as load balancing, power consumption balancing, heat generation balancing among the multiple member circuits by adopting the method of FIG. 2, thereby improving the overall performance of the multi-member Bluetooth device 100, increasing the durability of the Bluetooth circuit, or improving the user experiences.

In the embodiments of FIG. 2 through FIG. 4 described previously, the main Bluetooth circuit which currently plays the role of signal relay device conducts a bidirectional packet transmission with the remote Bluetooth device 102, and other member circuits indirectly receive the packets issued from the remote Bluetooth device 102 through the main Bluetooth circuit. In addition, the main Bluetooth circuit would determine whether to hand over the role of signal relay device currently played by the main Bluetooth circuit to other member circuit by evaluating the operating parameters, such as the computing loading, remaining power, temperature, and operating environment of the main Bluetooth circuit, and/or the deference between the operating parameters of the main Bluetooth circuit and the operating parameters of other member circuits. But this is merely an exemplary interaction between the multi-member Bluetooth device 100 of FIG. 1 and the remote Bluetooth device 102, rather than a restriction to the practical operations of the multi-member Bluetooth device 100.

Figure 5:
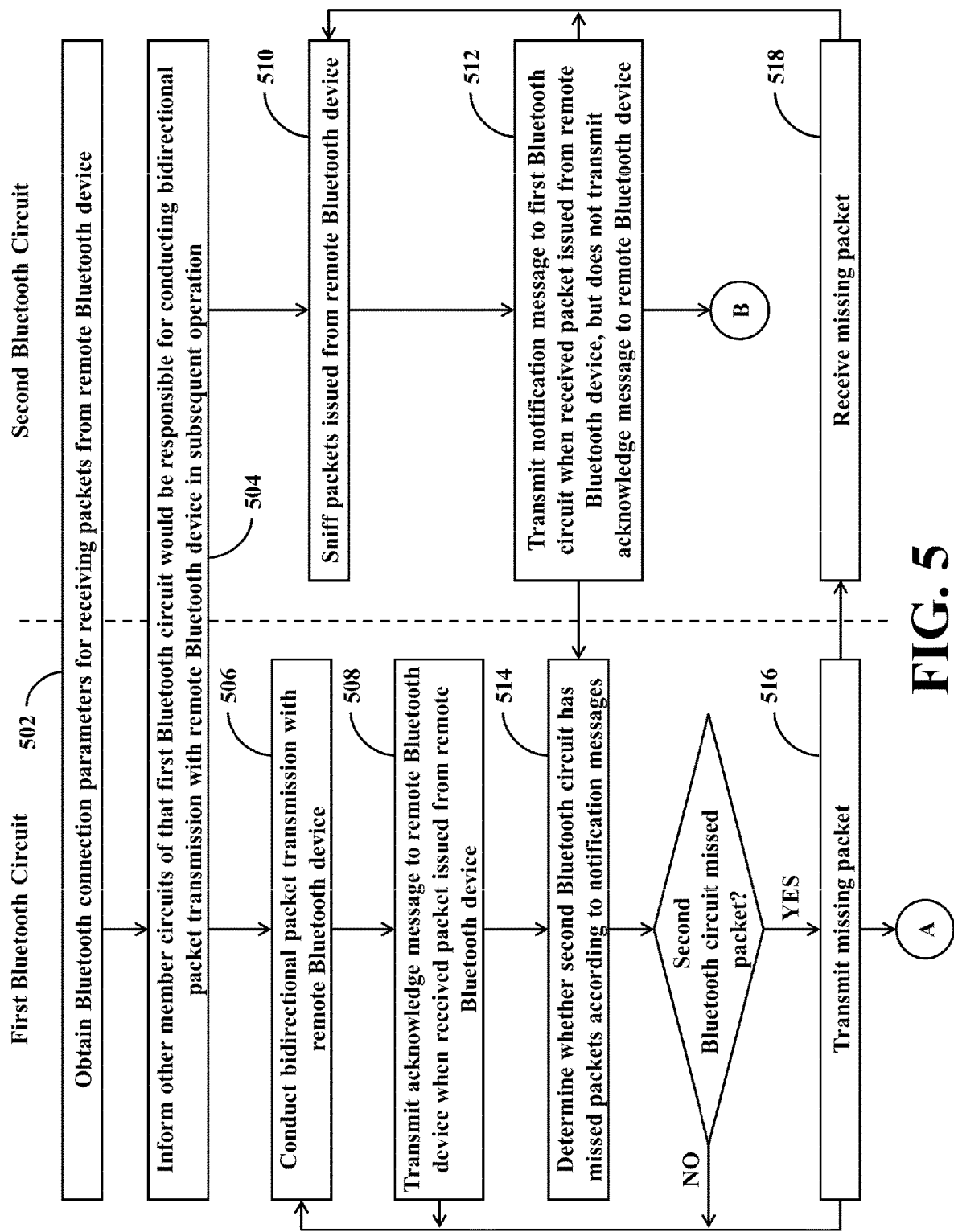
FIG. 5 shows a simplified flowchart illustrating another operating method of the interaction between the multi-member Bluetooth device and the remote Bluetooth device according to the present disclosure.
Figure 6:
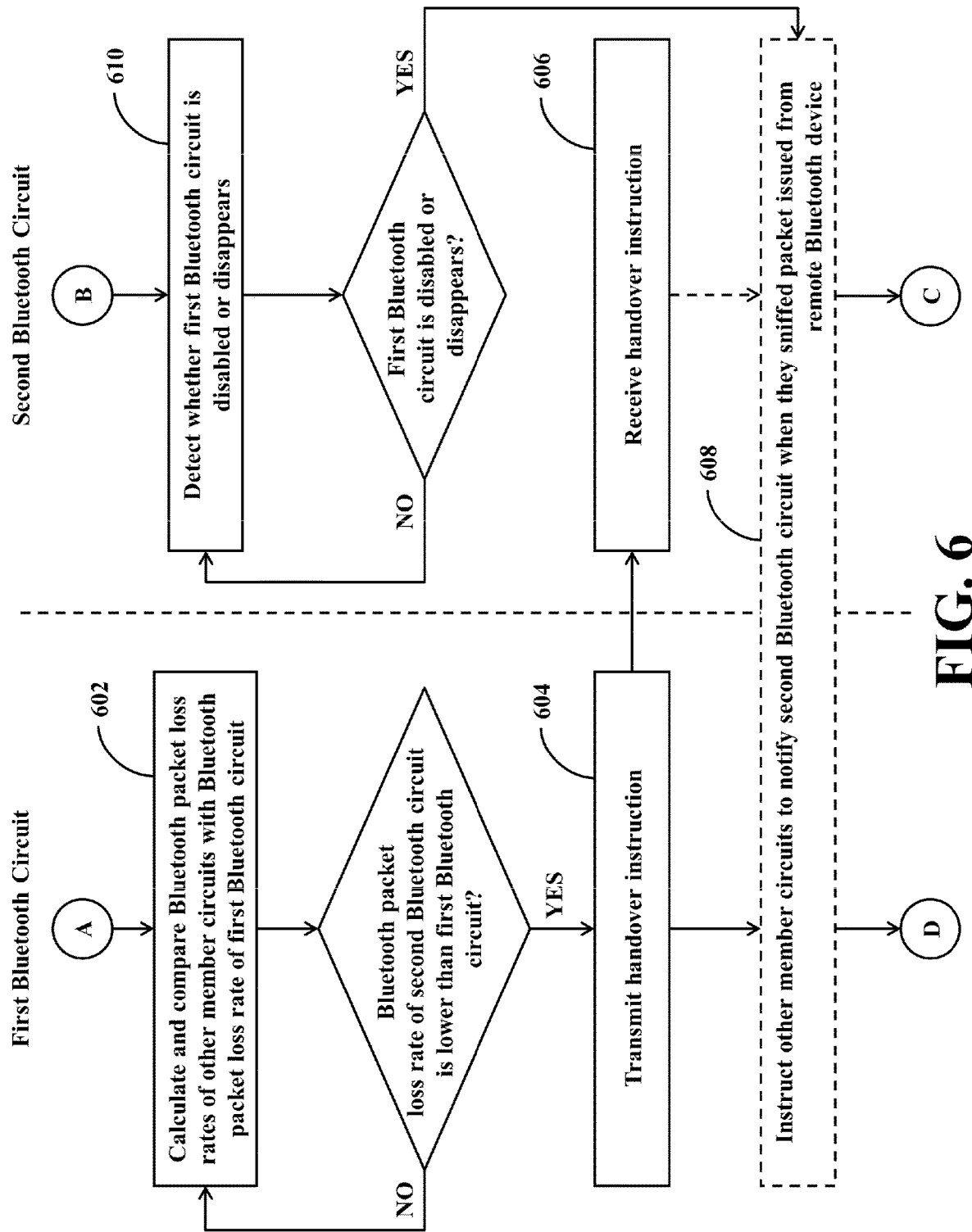
FIG. 6 and FIG. 7 show a simplified flowchart illustrating another method of seamless handover between different member circuits of the multi-member Bluetooth device according to the present disclosure.
Figure 7:
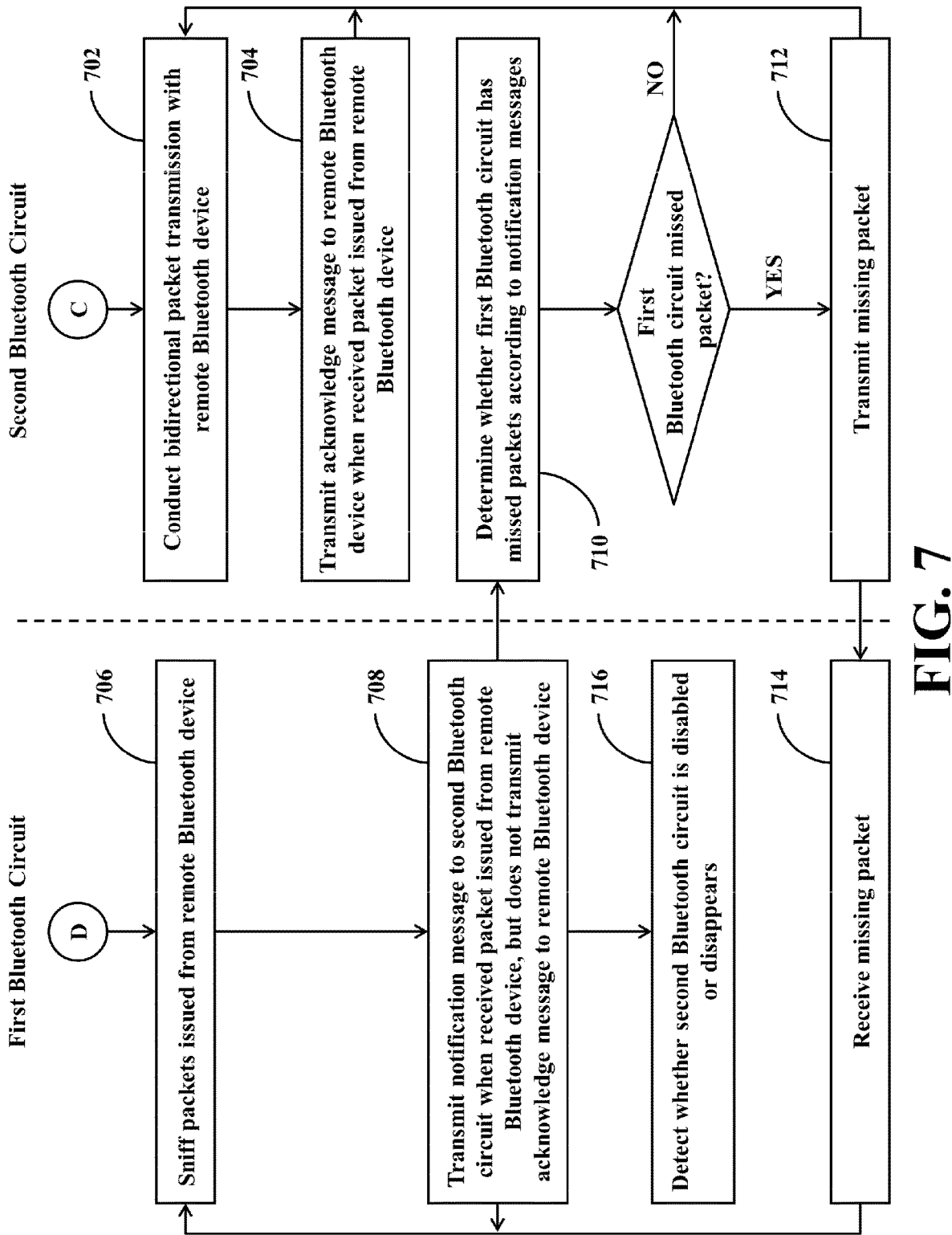

Another operation approach of the multi-member Bluetooth device 100 will be further described below with reference to FIG. 5 through FIG. 7. FIG. 5 shows a simplified flowchart illustrating another operating method of the interaction between the multi-member Bluetooth device 100 and the remote Bluetooth device 102 according to the present disclosure. FIG. 6 and FIG. 7 show a simplified flowchart illustrating another method of seamless handover between different member circuits of the multi-member Bluetooth device 100 according to the present disclosure.

In this embodiment, one of the member circuits (hereinafter, also referred to as a main Bluetooth circuit) in the multi-member Bluetooth device 100 is employed to responsible for conducting a bidirectional packet transmission with the remote Bluetooth device 102. During the period in which the main Bluetooth circuit conducts a bidirectional packet transmission with the remote Bluetooth device 102, other member circuits would sniff the packets issued from the remote Bluetooth device 102, but they are not allowed to transmit commands, data, or other related packets to the remote Bluetooth device 102. In other words, all member circuits in the multi-member Bluetooth device 100 of this embodiment would receive the packets issued from the remote Bluetooth device 102, but only the main Bluetooth circuit is allowed to transmit commands, data, or other related packets to the remote Bluetooth device 102

For the purpose of explanatory convenience in the following description, it is assumed hereinafter that the member circuit preselected from the multi-member Bluetooth device 100 to be responsible for conducting the bidirectional packet transmission with the remote Bluetooth device 102 is the first Bluetooth circuit 110.

As shown in FIG. 5, the multi-member Bluetooth device 100 would conduct the operation 502 to obtain the Bluetooth connection parameters required for receiving the packets transmitted from the remote Bluetooth device 102. In practice, the multi-member Bluetooth device 100 may utilize one of the member circuits to establish a connection with the remote Bluetooth device 102 so as to obtain related Bluetooth connection parameter, and then utilize that member circuit to transmit the obtained Bluetooth connection parameters to other member circuits.

In one embodiment, for example, the control circuit 115 of the first Bluetooth circuit 110 may control the Bluetooth communication circuit 111 to establish a Bluetooth connection with the remote Bluetooth device 102 in the operation 502, and utilize the data transmission circuit 113 to transmit the Bluetooth connection parameters between the first Bluetooth circuit 110 and the remote Bluetooth device 102 to the second Bluetooth circuit 120 and other member circuits, so that other member circuits can utilize the Bluetooth connection parameters to receive the packets issued by the remote Bluetooth device 102 in the subsequent operation.

In another embodiment, the control circuit 125 of the second Bluetooth circuit 120 may control the Bluetooth communication circuit 121 to establish a Bluetooth connection with the remote Bluetooth device 102 in the operation 502, and utilize the data transmission circuit 123 to transmit the Bluetooth connection parameters between the second Bluetooth circuit 120 and the remote Bluetooth device 102 to other member circuits, so that other member circuits can utilize the Bluetooth connection parameters to receive the packets issued by the remote Bluetooth device 102 in the subsequent operation. On the other hand, the control circuit 125 may also utilize the data transmission circuit 123 to transmit the device identification data of the second Bluetooth circuit 120 and the Bluetooth connection parameters between the second Bluetooth circuit 120 and the remote Bluetooth device 102 to the first Bluetooth circuit 110 in the operation 502, so that the first Bluetooth circuit 110 is enabled to conduct a bidirectional packet transmission with the remote Bluetooth device 102 in the operation 506. Afterwards, the second Bluetooth circuit 120 would conduct a unidirectional packet receiving operation to receive packets issued from the remote Bluetooth device 102, and no longer transmit packets to the remote Bluetooth device 102, so as to avoid the remote Bluetooth device 102 from packet conflict.

In the operation 504, the first Bluetooth circuit 110 informs other member circuits (e.g., the aforementioned second Bluetooth circuit 120 and third Bluetooth circuit 130) of the multi-member Bluetooth device 100 of that the first Bluetooth circuit 110 would be responsible for conducting a bidirectional packet transmission with the remote Bluetooth device 102. In the operation 504, the first Bluetooth circuit 110 also instructs other member circuits to notify the first Bluetooth circuit 110 once they sniffed (i.e., received) packets issued from the remote Bluetooth device 102. That is, other member circuits are allowed to receive the packets issued from the remote Bluetooth device 102, but they are not allowed to transmit commands, data, or other related packet to the remote Bluetooth device 102. The control circuit 115 may transmit the aforementioned notification and instruction to the data transmission circuits of other member circuits through the data transmission circuit 123.

Afterwards, the first Bluetooth circuit 110 performs the operation 506 when the remote Bluetooth device 102 needs to transmit various commands or data to the multi-member Bluetooth device 100, or when the multi-member Bluetooth device 100 needs to transmit various commands or data to the remote Bluetooth device 102.

In the operation 506, the control circuit 115 may utilize the Bluetooth communication circuit 111 to conduct a bidirectional packet transmission with the remote Bluetooth device 102 by utilizing the Bluetooth connection parameters obtained in the operation 502, so as to receive various commands or data transmitted from the remote Bluetooth device 102 or to transmit various commands or data to the remote Bluetooth device 102. It can be appreciated from the foregoing descriptions of the operation 502 that the Bluetooth connection parameters employed by the first Bluetooth circuit 110 in conducting the bidirectional packet transmission with the remote Bluetooth device 102, may be obtained by the first Bluetooth circuit 110 itself, or may be transmitted from other member circuit (e.g., the second Bluetooth circuit 120).

If the Bluetooth connection parameters employed by the first Bluetooth circuit 110 are obtained by the first Bluetooth circuit 110 itself, then the first Bluetooth circuit 110 may conduct the bidirectional packet transmission with the remote Bluetooth device 102 in the name of the first Bluetooth circuit 110 itself in the operation 506. If the Bluetooth connection parameters employed by the first Bluetooth circuit 110 are transmitted from the second Bluetooth circuit 120, then the first Bluetooth circuit 110 may conduct the bidirectional packet transmission with the remote Bluetooth device 102 in the name of the second Bluetooth circuit 120 in the operation 506.

Each time a packet transmitted from the remote Bluetooth device 102 is received by the Bluetooth communication circuit 111, the control circuit 115 of the first Bluetooth circuit 110 performs the operation 508 to transmit an acknowledge message corresponding to the received packet to the remote Bluetooth device 102 through the Bluetooth communication circuit 111. If the remote Bluetooth device 102 does not receive the acknowledge message corresponding to a specific packet, the remote Bluetooth device 102 would retransmit the specific packet to the Bluetooth communication circuit 111. In practice, the first Bluetooth circuit 110 and the remote Bluetooth device 102 may adopt various existing handshake mechanisms to reduce or prevent packet loss situation.

On the other hand, during the period in which the first Bluetooth circuit 110 conducts the bidirectional packet transmission with the remote Bluetooth device 102, other member circuits would perform the operation 510 to sniff the packets issued from the remote Bluetooth device 102.

For example, in the operation 510, the control circuit 125 of the second Bluetooth circuit 120 may utilize the Bluetooth communication circuit 121 to sniff the packets issued from the remote Bluetooth device 102 based on the Bluetooth connection parameters obtained in the operation 502. In one embodiment, the Bluetooth communication circuit 121 may sniff all Bluetooth packets issued from the remote Bluetooth device 102. In another embodiment, the Bluetooth communication circuit 121 only sniffs the Bluetooth packets to be transmitted to the first Bluetooth circuit 110 from the remote Bluetooth device 102, and does not sniff the Bluetooth packets to be transmitted to other devices than the multi-member Bluetooth device 100. It can be appreciated from the foregoing descriptions of the operation 502 that the Bluetooth connection parameters employed by the second Bluetooth circuit 120 in sniffing the packets issued from the remote Bluetooth device 102 may be obtained by the second Bluetooth circuit 120 itself, or may be transmitted from other member circuit (e.g., the first Bluetooth circuit 110).

Each time a packet issued from the remote Bluetooth device 102 is sniffed (i.e., received) by other member circuit, the member circuit would perform the operation 512. In the operation 512, the member circuit transmits a notification message corresponding to the received packet to the first Bluetooth circuit 110, but does not transmit any acknowledge message to the remote Bluetooth device 102. For example, each time a packet issued from the remote Bluetooth device 102 is received by the second Bluetooth circuit 120, the control circuit 125 performs the operation 512 to transmit a corresponding notification message to the data transmission circuit 113 of the first Bluetooth circuit 110 through the data transmission circuit 123, but the control circuit 125 does not transmit any acknowledge message to the remote Bluetooth device 102 through the Bluetooth communication circuit 121 or the data transmission circuit 123.

In other words, all of the first Bluetooth circuit 110 and other member circuits of this embodiment would receive the packets issued from the remote Bluetooth device 102, but only the first Bluetooth circuit 110 would transmit acknowledge messages corresponding to received packets to the remote Bluetooth device 102, while other member circuits do not transmit any acknowledge message to the remote Bluetooth device 102, in order to prevent the remote Bluetooth device 102 from making erroneous judgement. The remote Bluetooth device 102 does not know that the second Bluetooth circuit 120 are sniffing the packets issued from the remote Bluetooth device 102, and the second Bluetooth circuit 120 does not transmit any acknowledge message to the remote Bluetooth device 102. Accordingly, the second Bluetooth circuit 120 and the remote Bluetooth device 102 do not conduct any packet handshake procedure for the packets issued from the remote Bluetooth device 102.

In this embodiment, the purpose of that the second Bluetooth circuit 120 transmits the aforementioned notification message to the first Bluetooth circuit 110 is not for conducting a packet handshake procedure with the first Bluetooth circuit 110, bur for enabling the first Bluetooth circuit 110 to obtain the progress of sniffing the packets issued from the remote Bluetooth device 102 conducted by the second Bluetooth circuit 120.

In addition, the first Bluetooth circuit 110 does not utilize the notification message transmitted from the second Bluetooth circuit 120 as the basis for determining whether to transmit the acknowledge message to the remote Bluetooth device 102. The first Bluetooth communication circuit 111 of this embodiment does not check whether the data transmission circuit 113 receives the notification message transmitted from the second Bluetooth circuit 120 or not before transmitting the aforementioned acknowledge message to the remote Bluetooth device 102. Accordingly, the timing of that the first Bluetooth communication circuit 111 transmits the acknowledge message to the remote Bluetooth device 102 is not relevant to whether the data transmission circuit 113 receives the aforementioned notification message transmitted from the second Bluetooth circuit 120 or not.

For example, when the remote Bluetooth device 102 issues a specific Bluetooth packet, if the specific Bluetooth packet is received by the first Bluetooth circuit 110, but not sniffed by the second Bluetooth circuit 120, the first Bluetooth communication circuit 111 still transmits a corresponding acknowledge message to the remote Bluetooth device 102 through the Bluetooth communication circuit 111. On the contrary, if the specific Bluetooth packet is sniffed by the second Bluetooth circuit 120, but not received by the first Bluetooth circuit 110, the first Bluetooth communication circuit 111 would not transmit a corresponding acknowledge message to the remote Bluetooth device 102.

Apparently, when the control circuit 115 of the first Bluetooth circuit 110 determines whether to transmit an acknowledge message corresponding to a specific Bluetooth packet to the remote Bluetooth device 102 or not, the control circuit 115 does not consider whether the second Bluetooth circuit 120 transmits a notification message corresponding the specific Bluetooth packet to the first Bluetooth circuit 110.

In practice, the aforementioned notification message transmitted from the second Bluetooth circuit 120 to the first Bluetooth circuit 110 may be realized with various appropriate data formats. For example, when a specific Bluetooth packet transmitted from the remote Bluetooth device 102 is received by the second Bluetooth circuit 120, the control circuit 125 may extract a corresponding packet sequence number from the specific Bluetooth packet, and combine the packet sequence number with a device identification code or a device identification data for identifying the second Bluetooth circuit 120 to form a notification message corresponding the specific Bluetooth packet. For another example, the control circuit 125 may extract appropriate packet identification data from the specific Bluetooth packet, and combine the packet identification data with the device identification code or device identification data for identifying the second Bluetooth circuit 120 to form a notification message corresponding the specific Bluetooth packet.

It can be appreciated from the foregoing descriptions, when a period in which the remote Bluetooth device 102 successively issues multiple Bluetooth packets, the first Bluetooth circuit 110 would repeat the aforementioned operations 506 and 508 to thereby transmit multiple acknowledge messages to the remote Bluetooth device 102 in normal situation. On the other hand, other member circuits would repeat the aforementioned operations 510 and 512 to thereby transmit multiple notification messages to the first Bluetooth circuit 110. For example, the second Bluetooth circuit 120 would repeat the aforementioned operations 510 and 512 to transmit multiple notification messages corresponding to multiple Bluetooth packets issued by the remote Bluetooth device 102 to the first Bluetooth circuit 110.

In practical operations, respective member circuit might miss some packets issued from the remote Bluetooth device 102, and different member circuits might miss different packets or different quantities of packets. Accordingly, the first Bluetooth circuit 110 may intermittently or periodically perform the operation 514 to determine whether each member circuit has missed packets issued from the remote Bluetooth device 102 or not according to multiple notification messages transmitted from the member circuit.

For example, in the operation 514, the control circuit 115 of the first Bluetooth circuit 110 may check whether the second Bluetooth circuit 120 has missed some packets issued from the remote Bluetooth device 102 according to multiple notification messages transmitted from the second Bluetooth circuit 120. The control circuit 115 may extract multiple packet sequence numbers or multiple packet identification data from the multiple notification messages transmitted from the second Bluetooth circuit 120. The control circuit 115 may check the continuity of these packet sequence numbers or packet identification data to determine whether some packets issued from the remote Bluetooth device 102 are missed by the second Bluetooth circuit 120. If the aforementioned packet sequence numbers or the packet identification data lacks of continuity, the control circuit 115 may determine that the second Bluetooth circuit 120 has missed packets corresponding to the missing packet sequence number or the missing packet identification data. Based on the missing packet sequence number or the missing packet identification data, the control circuit 115 can further identify which packets are missed by the second Bluetooth circuit 120.

As described previously, a packet handshake mechanism is adopted between the first Bluetooth circuit 110 and the remote Bluetooth device 102, and thus the first Bluetooth circuit 110 should be able to successfully receive all packets issued from the remote Bluetooth device 102 in normal situation. If the control circuit 115 determines that a specific member circuit has missed some packets issued from the remote Bluetooth device 102, the control circuit 115 performs the operation 516 to transmit the missing packets of the specific member circuit to the specific member circuit through the data transmission circuit 113, so that the specific member circuit can obtain the missing packets.

By repeating the aforementioned operations, the other member circuits will be able to replenish missing packets with the assistance of the first Bluetooth circuit 110.

For example, if the control circuit 115 determines that the second Bluetooth circuit 120 has missed some packets issued from the remote Bluetooth device 102, the control circuit 115 performs the operation 516 to transmit the missing packets of the second Bluetooth circuit 120 to the second Bluetooth circuit 120 through the data transmission circuit 113. In this situation, the second Bluetooth circuit 120 would perform the operation 518 to receive the packets transmitted from the first Bluetooth circuit 110 through the data transmission circuit 123 to thereby replenish the missing packets.

During the period in which the multi-member Bluetooth device 100 interacts with the remote Bluetooth device 102, if other member circuits need to transmit commands or data to the remote Bluetooth device 102, they can transmit related commands or data to the first Bluetooth circuit 110 through their data transmission circuit. Then, the first Bluetooth circuit 110 would transmit the aforementioned commands or data to the remote Bluetooth device 102 through the Bluetooth communication circuit 111. In other words, other member circuits are enabled to indirectly transmit commands or data to the remote Bluetooth device 102 through the first Bluetooth circuit 110.

As can be appreciated from the foregoing descriptions, the first Bluetooth circuit 110 and the remote Bluetooth device 102 adopt the packet handshake mechanism to avoid packet loss. In addition, the timing of that the first Bluetooth communication circuit 111 transmits the acknowledge message to the remote Bluetooth device 102 is not relevant to whether the data transmission circuit 113 has received the aforementioned notification message transmitted from the second Bluetooth circuit 120 or not.

Accordingly, the operation of transmitting the notification messages to the first Bluetooth circuit 110 conducted by other member circuits when received the packets issued from the remote Bluetooth device 102 does not interfere with or delay the packet handshake procedure between the first Bluetooth circuit 110 and the remote Bluetooth device 102, nor create additional operating burden on the aforementioned packet handshake procedure of the first Bluetooth circuit 110.

On the other hand, since other member circuits (e.g., the aforementioned second Bluetooth circuit 120 and third Bluetooth circuit 130) in the multi-member Bluetooth device 100 would sniff the packets issued from the remote Bluetooth device 102, these member circuits should be able to receive most packets issued from the remote Bluetooth device 102 in normal situation. Therefore, the first Bluetooth circuit 110 currently acting as the main Bluetooth circuit only needs to transmit the missing packets to respective member circuit, and does not need to transmit all packets issued from the remote Bluetooth device 102 to other member circuits.

In comparison with the embodiment of FIG. 2, the multi-member Bluetooth device 100 can significantly reduce the packet forwarding workload of the main Bluetooth circuit (e.g., the first Bluetooth circuit 110 in this case) by adopting the method of FIG. 5 to interact with the remote Bluetooth device 102, thereby reducing the power consumption of the main Bluetooth circuit. As a result, the serving time and the standby time of the main Bluetooth circuit can be effectively extended.

Additionally, the method of FIG. 5 can also significantly reduce the bandwidth requirement for data transmission between the main Bluetooth circuit and other member circuits, and thus the hardware design of the main Bluetooth circuit and other member circuits can be simplified, and/or the circuit complexity and circuit cost can be reduced.

In operations, the member circuits of the multi-member Bluetooth device 100 may adopt various appropriate data synchronization mechanisms to ensure that different member circuits can simultaneously playback the audio data of video data transmitted from the remote Bluetooth device 102, to prevent the member circuits from having inconsistent playback timings.

During the period in which the multi-member Bluetooth device 100 interacts with the remote Bluetooth device 102 by adopting the aforementioned method of FIG. 5, the main Bluetooth circuit may intermittently evaluate whether to hand over the role of main Bluetooth circuit to other member circuits. Similarly, other member circuits may intermittently evaluate whether to actively take over the role of main Bluetooth circuit. Another method of seamless handover between different member circuits of the multi-member Bluetooth device 100 will be further described below with reference to FIG. 6 through FIG. 7.

For example, during the operations of the multi-member Bluetooth device 100, the control circuit 115 of the first Bluetooth circuit 110 may periodically or intermittently perform the operation 602 of FIG. 6, while the control circuits of other member circuits may periodically or intermittently perform the operation 610 of FIG. 6.

In the operation 602, the control circuit 115 calculates the Bluetooth packet loss rate of other member circuits, and compares the Bluetooth packet loss rates of other member circuits with the Bluetooth packet loss rate of the first Bluetooth circuit 110 to evaluate the relative signal reception quality between the first Bluetooth circuit 110 and other member circuits. For the first Bluetooth circuit 110, when a certain member circuit has a higher Bluetooth packet loss rate, it means that the first Bluetooth circuit 110 may need to replenish packets to that member circuit more frequently.

For example, the control circuit 115 may, based on the determining results of the aforementioned operation 514, calculate a total number of times, an average number of times, or a moving average number of times that a specific member circuit (e.g., the second Bluetooth circuit 120) missed packets issued from the remote Bluetooth device 102, and utilize the calculated result to represent the Bluetooth packet loss rate of the specific member circuit.

For another example, the control circuit 115 may calculate a total number of times or a moving average number of times that the first Bluetooth circuit 110 replenished packets to a specific member circuit, and utilize the calculated result to represent the Bluetooth packet loss rate of the specific member circuit.

If the control circuit 115 finds that the Bluetooth packet loss rate of other member circuit is lower than the Bluetooth packet loss rate of the first Bluetooth circuit 110, the first Bluetooth circuit 110 may perform the operation 604. On the contrary, the first Bluetooth circuit 110 may continuously monitor the change in the Bluetooth packet loss rate of respective member circuits.

In the operation 604, the control circuit 115 may select one member circuit out of other member circuits having lower Bluetooth packet loss rate than the first Bluetooth circuit 110 to play the role of main Bluetooth circuit in the subsequent operation, and transmit a handover instruction to the selected member circuit through the data transmission circuit 113.

For example, the control circuit 115 may select the member circuit having the lowest Bluetooth packet loss rate to play the role of main Bluetooth circuit in the subsequent operation.

Alternatively, the control circuit 115 may select an arbitrary member circuit out of other member circuits having lower Bluetooth packet loss rate than the first Bluetooth circuit 110 at a predetermined point of time to play the role of main Bluetooth circuit in the subsequent operation.

For the purpose of explanatory convenience in the following description, it is assumed hereinafter that the control circuit 115 selects the second Bluetooth circuit 120 to play the role of main Bluetooth circuit in the subsequent operation in the aforementioned operation 604.

Therefore, the control circuit 115 transmits the handover instruction to the second Bluetooth circuit 120 through the data transmission circuit 113 and the data transmission circuit 123 in the operation 604.

The handover instruction transmitted by the control circuit 115 in the operation 604 is utilized for instructing the second Bluetooth circuit 120 to take over the role of the first Bluetooth circuit 110 to directly conduct a bidirectional packet transmission with the remote Bluetooth device 102. That is, the handover instruction is utilized for instructing the second Bluetooth circuit 120 to conduct a bidirectional packet transmission with the remote Bluetooth device 102 using a Bluetooth transmission approach, so as to play the role of main Bluetooth circuit in the subsequent operation.

If the Bluetooth connection parameters referred in the aforementioned operation 502 are obtained by the first Bluetooth circuit 110 and transmitted to the second Bluetooth circuit 120, then the control circuit 115 may further transmit the device identification data of the first Bluetooth circuit 110 to the second Bluetooth circuit 120 through the data transmission circuit 113 and the data transmission circuit 123 in the operation 604.

In the operation 606, the control circuit 125 of the second Bluetooth circuit 120 receives the handover instruction transmitted from the first Bluetooth circuit 110 through the data transmission circuit 123.

In the operation 608, the first Bluetooth circuit 110 or the second Bluetooth circuit 120 would inform other member circuits in the multi-member Bluetooth device 100 that the second Bluetooth circuit 120 will be responsible for conducting the bidirectional packet transmission with the remote Bluetooth device 102 in the subsequent operation. Additionally, the first Bluetooth circuit 110 or the second Bluetooth circuit 120 would instruct other member circuits to instead notify the second Bluetooth circuit 120 once they sniffed (i.e., received) packets issued from the remote Bluetooth device 102. That is, the second Bluetooth circuit 120 will take over the role of main Bluetooth circuit in the subsequent operation. In the operation 608, the control circuit 115 or 125 may transmit the aforementioned notification and instruction to the data transmission circuits of other member circuits through corresponding data transmission circuit.

After the first Bluetooth circuit 110 or the second Bluetooth circuit 120 performed the operation 608, the first Bluetooth circuit 110 would conduct a unidirectional packet receiving operation to receive packets issued from the remote Bluetooth device 102, and no longer transmit packets to the remote Bluetooth device 102, so as to avoid the remote Bluetooth device 102 from packet conflict.

Since the bidirectional packet transmission with the remote Bluetooth device 102 in the subsequent operation is conducted by the second Bluetooth circuit 120 that has a lower Bluetooth packet loss rate than the first Bluetooth circuit 110, the possibility of that the remote Bluetooth device 102 needs to retransmit packets can be reduced, thereby reducing the workload of the remote Bluetooth device 102.

As described previously, when the multi-member Bluetooth device 100 adopts the method of FIG. 5 to interact with the remote Bluetooth device 102, the control circuit of other member circuit may periodically or intermittently perform the operation 610 of FIG. 6 to detect whether the main Bluetooth circuit 110 is disabled or disappears.

For example, the control circuit 125 of the second Bluetooth circuit 120 may detect whether the main Bluetooth circuit 110 is disabled or disappears in the operation 610. In practice, the control circuit 125 may detect whether the main Bluetooth circuit 110 is disabled or disappears by evaluating the data communication situation between the second Bluetooth circuit 120 and the first Bluetooth circuit 110 that currently acts as the main Bluetooth circuit.

The aforementioned data communication situation between the second Bluetooth circuit 120 and the first Bluetooth circuit 110 mainly refers to whether the data transmission circuits 123 and 113 still maintain normal communication with each other or not.

In this embodiment, the control circuit 125 may determine that the main Bluetooth circuit 110 is disabled or disappears if the first Bluetooth circuit 110 does not interact with the second Bluetooth circuit 120 more than a predetermined time, or the frequency of that the first Bluetooth circuit 110 does not replenish missing packets to the second Bluetooth circuit 120 is more than a predetermined threshold.

When the control circuit 125 determines that the first Bluetooth circuit 110 is disabled or disappears, the second Bluetooth circuit 120 may perform the aforementioned operation 608 to inform other member circuits (including the first Bluetooth circuit 110) in the multi-member Bluetooth device 100 that the second Bluetooth circuit 120 will be responsible for conducting the bidirectional packet transmission with the remote Bluetooth device 102 in the subsequent operation. Additionally, the second Bluetooth circuit 120 would instruct other member circuits to instead notify the second Bluetooth circuit 120 once they sniffed (i.e., received) packets issued from the remote Bluetooth device 102. That is, the second Bluetooth circuit 120 will take over the role of main Bluetooth circuit in the subsequent operation.

The multi-member Bluetooth device 100 then performs the operations of FIG. 7 to interact with the remote Bluetooth device 102 in the case of that the second Bluetooth circuit 120 actively takes over the role of main Bluetooth circuit or that the first Bluetooth circuit 110 appoints the second Bluetooth circuit 120 to take over the role of main Bluetooth circuit.

In the operation 702, the second Bluetooth circuit 120 replace the first Bluetooth circuit 110 to play the role responsible for conducting the bidirectional packet transmission with the remote Bluetooth device 102.

For example, in the case of that the first Bluetooth circuit 110 conducts the bidirectional packet transmission with the remote Bluetooth device 102 in the aforementioned operation 506 in the name of the first Bluetooth circuit 110 itself, while the first Bluetooth circuit 110 transmits the device identification data of the first Bluetooth circuit 110 to the second Bluetooth circuit 120 in the aforementioned operation 604, the control circuit 125 of the second Bluetooth circuit 120 may control the Bluetooth communication circuit 121 to directly conduct a bidirectional packet transmission with the remote Bluetooth device 102 by imitating the first Bluetooth circuit 110 utilizing the device identification data and the Bluetooth connection parameters provided by the first Bluetooth circuit 110, so as to receive various commands or data transmitted from the remote Bluetooth device 102 or to transmit various commands or data to the remote Bluetooth device 102. It is the same as the previous embodiment of FIG. 2 that "imitating" the first Bluetooth circuit 110 means that when the second Bluetooth circuit 120 conducts bidirectional packer transmission with the remote Bluetooth device 102, the second Bluetooth circuit 120 utilizes the device identification data of the first Bluetooth circuit 110 as the device identification data of the second Bluetooth circuit 120 on purpose, to thereby render the remote Bluetooth device 102 to believe that the remote Bluetooth device 102 is still conducting Bluetooth communication with the same target as in the aforementioned operation 506, i.e., the first Bluetooth circuit 110.

For another example, in the case of that the Bluetooth connection parameters referred in the aforementioned operation 502 are obtain by the second Bluetooth circuit 120 and transmitted to the first Bluetooth circuit 110, while the first Bluetooth circuit 110 conducts the bidirectional packet transmission with the remote Bluetooth device 102 in the aforementioned operation 506 in the name of the second Bluetooth circuit 120, the control circuit 125 of the second Bluetooth circuit 120 may control the Bluetooth communication circuit 121 to directly conduct a bidirectional packet transmission with the remote Bluetooth device 102 utilizing the device identification data of the second Bluetooth circuit 120 and the Bluetooth connection parameters previously obtained by the second Bluetooth circuit 120, so as to receive various commands or data transmitted from the remote Bluetooth device 102 or to transmit various commands or data to the remote Bluetooth device 102. It is different from the previous embodiment that the second Bluetooth circuit 120 of this embodiment conducts packet transmission with the remote Bluetooth device 102 in the name of the second Bluetooth circuit 120 itself, instead of imitating the first Bluetooth circuit 110, but the remote Bluetooth device 102 still believes that the remote Bluetooth device 102 is conducting Bluetooth communication with the same target as in the aforementioned operation 506, i.e., the second Bluetooth circuit 120.

Similarly, the second Bluetooth circuit 120 does not need to ask for a permission from the remote Bluetooth device 102 before it replaces the first Bluetooth circuit 110 to play the role of conducting the bidirectional packet transmission with the remote Bluetooth device 102. Accordingly, after the second Bluetooth circuit 120 takes over the role of the first Bluetooth circuit 110, the remote Bluetooth device 102 does not ask the second Bluetooth circuit 120 to reestablish a Bluetooth connection with the remote Bluetooth device 102.

In other words, since the second Bluetooth circuit 120 replaces the first Bluetooth circuit 110 to play the role of conducting the bidirectional packet transmission with the remote Bluetooth device 102 in the way described previously, the second Bluetooth circuit 120 does not need to spend time reestablishing a Bluetooth connection with the remote Bluetooth device 102. For another aspect, the foregoing approach can effectively prevent the second Bluetooth circuit 120 from signal interruption caused by reestablishing Bluetooth connection with the remote Bluetooth device 102.

Afterwards, each time a packet issued from the remote Bluetooth device 102 is received by the Bluetooth communication circuit 121, the control circuit 112 of the second Bluetooth circuit 120 performs the operation 704 to transmit an acknowledge message corresponding to the received packet to the remote Bluetooth device 102 through the Bluetooth communication circuit 121. If the remote Bluetooth device 102 does not receive the acknowledge message corresponding to a specific packet, the remote Bluetooth device 102 would retransmit the specific packet to the Bluetooth communication circuit 121. Similar to the previous embodiment of FIG. 5, the second Bluetooth circuit 120 and the remote Bluetooth device 102 may adopt various existing handshake mechanisms to reduce or prevent packet loss situation. As a result, the Bluetooth packet loss rate of the second Bluetooth circuit 120 can be effectively reduced.

On the other hand, during the period in which the second Bluetooth circuit 120 conducts the bidirectional packet transmission with the remote Bluetooth device 102, other member circuits would perform the operation 706 to sniff the packets issued from the remote Bluetooth device 102.

In the operation 706, the control circuit of other member circuit may utilize the associated Bluetooth communication circuit to sniff the packets issued from the remote Bluetooth device 102 based on the Bluetooth connection parameters obtained in the operation 502. In one embodiment, other member circuit may sniff all Bluetooth packets issued from the remote Bluetooth device 102. In another embodiment, other member circuit only sniffs the Bluetooth packets to be transmitted to the second Bluetooth circuit 120 from the remote Bluetooth device 102, and does not sniff the Bluetooth packets to be transmitted to other devices than the multi-member Bluetooth device 100.

For example, while the second Bluetooth circuit 120 performs the operation 702 to conduct the bidirectional packet transmission with the remote Bluetooth device 102, the control circuit 115 of the first Bluetooth circuit 110 may utilize the Bluetooth communication circuit 111 to sniff the packets issued from the remote Bluetooth device 102.

Each time a packet issued from the remote Bluetooth device 102 is sniffed (i.e., received) by other member circuit (including the first Bluetooth circuit 110), the member circuit would perform the operation 708. In the operation 708, the member circuit transmits a notification message corresponding to the received packet to the second Bluetooth circuit 120, but does not transmit any acknowledge message to the remote Bluetooth device 102.

In other words, the operation 708 performed by other member circuits is similar to the operation 512 of FIG. 5 described previously, and the difference between the operation 708 and the operation 512 is that the object to which the notification message is transmitted in the operation 708 is the second Bluetooth circuit 120 currently playing the role of main Bluetooth circuit, instead of the first Bluetooth circuit 110 in the operation 512.

Accordingly, all of the member circuits of the multi-member Bluetooth device 100 would receive the packets issued from the remote Bluetooth device 102, but only the second Bluetooth circuit 120 that currently plays the role of main Bluetooth circuit would transmit acknowledge messages corresponding to received packets to the remote Bluetooth device 102, while other member circuits do not transmit any acknowledge message to the remote Bluetooth device 102, in order to prevent the remote Bluetooth device 102 from making erroneous judgement.

For example, each time a packet issued from the remote Bluetooth device 102 is received by the first Bluetooth circuit 110, the control circuit 115 performs the operation 708 to transmit a corresponding notification message to the data transmission circuit 123 of the second Bluetooth circuit 120 through the data transmission circuit 113, but the control circuit 115 does not transmit any acknowledge message to the remote Bluetooth device 102 through the Bluetooth communication circuit 111 or the data transmission circuit 113. That is, during the period in which the second Bluetooth circuit 120 conducts the bidirectional packet transmission with the remote Bluetooth device 102, the first Bluetooth circuit 110 no longer conducts the packet handshake procedure with remote Bluetooth device 102.

In this embodiment, the purpose of that the first Bluetooth circuit 110 transmits the aforementioned notification message to the second Bluetooth circuit 120 is not for conducting a packet handshake procedure with the second Bluetooth circuit 120, bur for enabling the second Bluetooth circuit 120 to obtain the progress of sniffing the packets issued from the remote Bluetooth device 102 conducted by the first Bluetooth circuit 110.

Similar to the embodiment of FIG. 5, the second Bluetooth circuit 120 may intermittently or periodically perform the operation 710 to determine whether each member circuit has missed packets issued from the remote Bluetooth device 102 or not according to multiple notification messages transmitted from the member circuit.

For example, in the operation 710, the control circuit 125 of the second Bluetooth circuit 120 may check whether the first Bluetooth circuit 110 has missed some packets issued from the remote Bluetooth device 102 according to multiple notification messages transmitted from the first Bluetooth circuit 110. The control circuit 125 may extract multiple packet sequence numbers or multiple packet identification data from the multiple notification messages transmitted from the first Bluetooth circuit 110. The control circuit 125 may check the continuity of these packet sequence numbers or packet identification data to determine whether some packets issued from the remote Bluetooth device 102 are missed by the first Bluetooth circuit 110. If the aforementioned packet sequence numbers or the packet identification data lacks of continuity, the control circuit 125 may determine that the first Bluetooth circuit 110 has missed packets corresponding to the missing packet sequence number or the missing packet identification data. Based on the missing packet sequence number or the missing packet identification data, the control circuit 125 can further identify which packets are missed by the first Bluetooth circuit 110.

As described previously, a packet handshake mechanism is adopted between the second Bluetooth circuit 120 and the remote Bluetooth device 102, and thus the second Bluetooth circuit 120 should be able to successfully receive all packets issued from the remote Bluetooth device 102 in normal situation. If the control circuit 125 determines that a specific member circuit has missed some packets issued from the remote Bluetooth device 102, the control circuit 125 performs the operation 712 to transmit the missing packets of the specific member circuit to the specific member circuit through the data transmission circuit 123, so that the specific member circuit can obtain the missing packets.

By repeating the aforementioned operations, the other member circuits will be able to replenish missing packets with the assistance of the second Bluetooth circuit 120.

For example, if the control circuit 125 determines that the first Bluetooth circuit 110 has missed some packets issued from the remote Bluetooth device 102, the control circuit 125 performs the operation 712 to transmit the missing packets of the first Bluetooth circuit 110 to the first Bluetooth circuit 110 through the data transmission circuit 123. In this situation, the first Bluetooth circuit 110 would perform the operation 714 to receive the packets transmitted from the second Bluetooth circuit 120 through the data transmission circuit 113 to thereby replenish the missing packets.

During the period in which the second Bluetooth circuit 120 plays the role of main Bluetooth circuit, if other member circuits need to transmit commands or data to the remote Bluetooth device 102, they can transmit related commands or data to the second Bluetooth circuit 120 through their data transmission circuit. Then, the second Bluetooth circuit 120 would transmit the aforementioned commands or data to the remote Bluetooth device 102 through the Bluetooth communication circuit 121. In other words, other member circuits are enabled to indirectly transmit commands or data to the remote Bluetooth device 102 through the second Bluetooth circuit 120.

Similarly, during the period in which the multi-member Bluetooth device 100 adopts the method of FIG. 7 to interact with the remote Bluetooth device 102, the second Bluetooth circuit 120 that plays the role of main Bluetooth circuit may periodically or intermittently calculate the Bluetooth packet loss rate of other member circuits, and compare the Bluetooth packet loss rates of other member circuits with the Bluetooth packet loss rate of the second Bluetooth circuit 120 to evaluate the relative signal reception quality between the second Bluetooth circuit 120 and other member circuits. Above evaluating operation is similar to what the first Bluetooth circuit 110 conducted in the operation 602. Similarly, other member circuits may periodically or intermittently evaluate whether to actively take over the role of main Bluetooth circuit.

For example, the control circuit 115 of the first Bluetooth circuit 110 may periodically or intermittently perform the operation 716 of FIG. 7 to detect whether the second Bluetooth circuit is disabled or disappears in a way similar to what the second Bluetooth circuit 120 conducted in the operation 610.

Please note that the seamless handover method of FIG. 6 through FIG. 7 is merely an exemplary embodiment, rather than a restriction to practical implementations. In practice, during the period in which the multi-member Bluetooth device 100 adopts the method of FIG. 5 to interact with the remote Bluetooth device 102, the main Bluetooth circuit may perform the aforementioned evaluating operation 210 of FIG. 2 to determine whether to hand over the role of main Bluetooth circuit to other member circuits or not.

For example, during the period in which the multi-member Bluetooth device 100 adopts the method of FIG. 5 to interact with the remote Bluetooth device 102, the first Bluetooth circuit 110 that plays the role of main Bluetooth circuit may utilize the determining circuit 117 to evaluate the operating parameters (such as the computing loading, the remaining power, the temperature, and/or the operating environment) of the first Bluetooth circuit 110 to determine whether the first Bluetooth circuit 110 needs to hand over the role of main Bluetooth circuit to other member circuits. The determining circuit 117 may determine that the first Bluetooth circuit 110 needs to hand over the role of main Bluetooth circuit to other member circuits in the case that the computing loading of the first Bluetooth circuit 110 exceeds a predetermined level, the remaining power of the first Bluetooth circuit 110 is below a predetermined level, the temperature of the first Bluetooth circuit 110 exceeds a predetermined temperature, and/or the operating environment of the first Bluetooth circuit 110 deviates from a predetermined condition.

For another example, when conducting the above evaluating operation, the determining circuit 117 may also compare the operating parameters of the first Bluetooth circuit 110 with corresponding operating parameters of other member circuits, and utilize the comparing result as a reference basis of determining whether the first Bluetooth circuit 110 needs to hand over the role of main Bluetooth circuit to other member circuits. In this embodiment, other member circuits may utilize their determining circuit to evaluate their own operating parameters, such as the computing loading, the remaining power, the temperature, and/or the operating environment, and transmit the obtained operating parameters to the determining circuit 117 of the first Bluetooth circuit 110. The determining circuit 117 may determine that the first Bluetooth circuit 110 needs to hand over the role of main Bluetooth circuit to other member circuits in the case that the computing loading of the first Bluetooth circuit 110 exceeds the computing loading of other member circuit to a predetermined degree, the remaining power of the first Bluetooth circuit 110 is below the remaining power of other member circuit to a predetermined degree, the temperature of the first Bluetooth circuit 110 exceeds the temperature of other member circuit to a predetermined degree, and/or the operating environment of the first Bluetooth circuit 110 deviates from corresponding predetermined conditions but the operating environment of other member circuit matches corresponding predetermined conditions.

In practice, the determining circuit 117 may take both the aforementioned operating parameters of the first Bluetooth circuit 110 and the difference between operating parameters of the first Bluetooth circuit 110 and corresponding operating parameters of other member circuits into consideration in the aforementioned evaluating operation.

For example, the determining circuit 117 may determine that the first Bluetooth circuit 110 needs to hand over the role of main Bluetooth circuit to other member circuits in the case that the computing loading of the first Bluetooth circuit 110 exceeds a predetermined level, the remaining power of the first Bluetooth circuit 110 is below a predetermined level, the temperature of the first Bluetooth circuit 110 exceeds a predetermined temperature, the computing loading of the first Bluetooth circuit 110 exceeds the computing loading of other member circuit to a predetermined degree, the remaining power of the first Bluetooth circuit 110 is below the remaining power of other member circuit to a predetermined degree, the temperature of the first Bluetooth circuit 110 exceeds the temperature of other member circuit to a predetermined degree, and/or the operating environment of the first Bluetooth circuit 110 deviates from corresponding predetermined conditions but the operating environment of other member circuit matches corresponding predetermined conditions Once the determining circuit 117 determines that the first Bluetooth circuit 110 needs to hand over the role of main Bluetooth circuit to other member circuits, the first Bluetooth circuit 110 may perform the operation 604 of FIG. 6 to transmit the handover instruction to a suitable member circuit (e.g., the aforementioned second Bluetooth circuit 120).

It can be appreciated from the foregoing elaborations that during a period in which the first Bluetooth circuit 110 conducts a bidirectional packet transmission with the remote Bluetooth device 102 through the Bluetooth communication circuit 111, the Bluetooth communication circuit 121 of the second Bluetooth circuit 120 does not conduct a bidirectional packet transmission with the remote Bluetooth device 102; while during a period in which the second Bluetooth circuit 120 conducts a bidirectional packet transmission with the remote Bluetooth device 102 through the Bluetooth communication circuit 121, the Bluetooth communication circuit 111 of the first Bluetooth circuit 110 does not conduct a bidirectional packet transmission with the remote Bluetooth device 102.

Please note that the executing order of the operations in FIG. 5 through FIG. 7 is merely an exemplary embodiment, rather than a restriction to the practical implementations.

For example, the operations 502 and 504 in FIG. 5 may be simultaneously performed or may be swapped with each other.

For another example, each of the operations 602 and 610 in FIG. 6 may be performed at any point of time between the operations 506 and 518.

In some embodiments, the operations 602, 604, and 606 in FIG. 6 may be omitted, or the operation 6 may be omitted.

The quantity of the member circuits in the multi-member Bluetooth device 100 may be reduced to two, or may be increased depending on the requirement of practical circuit applications. In the embodiments where the multi-member Bluetooth device 100 comprises only two member circuits, when the second Bluetooth circuit 120 determines that the first Bluetooth circuit 110 is disabled or disappears in the operation 610 of FIG. 6, the second Bluetooth circuit 120 may skip the operation 608 and jump to the operation 702 of FIG. 7.

Additionally, the determining circuit 117 of the first Bluetooth circuit 110 and/or the determining circuit 127 of the second Bluetooth circuit 120 may be omitted in some embodiments.

It can be appreciated from the foregoing descriptions that during the period in which the multi-member Bluetooth device 100 adopts the method of FIG. 5 to interact with the remote Bluetooth device 102, each of other member circuits would sniff the packets issued from the remote Bluetooth device 102. Therefore, the main Bluetooth circuit only needs to transmit the missing packets of other member circuits to other member circuits, and does not need to forward all packets issued from the remote Bluetooth device 102 other member circuits. Accordingly, the multi-member Bluetooth device 100 can significantly reduce the packet forwarding workload of the main Bluetooth circuit by adopting the method of FIG. 5 to interact with the remote Bluetooth device 102, thereby reducing the power consumption and heat generation of the main Bluetooth circuit. As a result, it can effectively extend the serving time and the standby time of the main Bluetooth circuit, increase the durability of the main Bluetooth circuit, and/or improve the user experience.

Additionally, the method of FIG. 5 can also significantly reduce the bandwidth requirement for data transmission between the main Bluetooth circuit and other member circuits, and thus the hardware design of the main Bluetooth circuit and other member circuits can be simplified, and/or the circuit complexity and circuit cost can be reduced.

Furthermore, when the Bluetooth packet loss rate of other member circuits is lower than the Bluetooth packet loss rate of the main Bluetooth circuit, or when the main Bluetooth circuit is disabled or disappears, other member circuits may take over the role of main Bluetooth circuit to conduct the bidirectional packet transmission with the remote Bluetooth device 102, and does not need to reestablish a Bluetooth connection with the remote Bluetooth device 102, thereby effectively avoid the member circuits in the multi-member Bluetooth device 100 from signal interruption.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A main Bluetooth circuit (110) of a multi-member Bluetooth device (100), wherein the multi-member Bluetooth device (100) is utilized for communicating data with a remote Bluetooth device (102) and comprises the main Bluetooth circuit (110) and an auxiliary Bluetooth circuit (120), the main Bluetooth circuit (110) comprising:
  a Bluetooth communication circuit (111);
  a data transmission circuit (113);
  a control circuit (115) arranged to operably conduct a bidirectional packet transmission with the remote Bluetooth device (102) through the Bluetooth communication circuit (111) by utilizing a Bluetooth wireless transmission approach, and arranged to operably communicate data with other devices through the data transmission circuit (113); and
  a determining circuit (117) coupled with the control circuit (115) and arranged to operably evaluate a computing loading of the main Bluetooth circuit (110) or a temperature of the main Bluetooth circuit (110);
  wherein the control circuit (115) instructs the auxiliary Bluetooth circuit (120) to replace the main Bluetooth circuit (110) for conducting a bidirectional packet transmission with the remote Bluetooth device (102) when the computing loading of the main Bluetooth circuit (110) exceeds a predetermined level or the temperature of the main Bluetooth circuit (110) exceeds a predetermined temperature;
  wherein when the Bluetooth communication circuit (111) conducts the bidirectional packet transmission with the remote Bluetooth device (102), the auxiliary Bluetooth circuit (120) sniffs packets issued from the remote Bluetooth device (102); and
  when the control circuit (115) has detected that the auxiliary Bluetooth circuit (120) has missed packets issued from the remote Bluetooth device (102), the control circuit (115) is further arranged to operably transmit missing packets of the auxiliary Bluetooth circuit (120) to the auxiliary Bluetooth circuit (120) through the data transmission circuit (113).

2. The main Bluetooth circuit (110) of claim 1, wherein the control circuit (115) is further arranged to operably transmit an acknowledge message to the remote Bluetooth device (102) through the Bluetooth communication circuit (111) when a packet transmitted from the remote Bluetooth device (102) is received by the control circuit (115);

wherein when the packet transmitted from the remote Bluetooth device (102) is received by the auxiliary Bluetooth circuit (120), the auxiliary Bluetooth circuit (120) is arranged to operably transmit a corresponding notification message to the data transmission circuit (113), and does not transmit any acknowledge message to the remote Bluetooth device (102);

wherein a timing that the Bluetooth communication circuit (111) transmits the acknowledge message to the remote Bluetooth device (102) is not relevant to whether the notification message is received by the data transmission circuit (113) or not.

3. The main Bluetooth circuit (110) of claim 2, wherein the control circuit (115) is further arranged to operably determine whether the auxiliary Bluetooth circuit (120) missed packets issued from the remote Bluetooth device (102) according to multiple notification messages transmitted from the auxiliary Bluetooth circuit (120).

4. The main Bluetooth circuit (110) of claim 2, wherein the control circuit (115) is further arranged to operably instruct the auxiliary Bluetooth circuit (120) to replace the main Bluetooth circuit (110) to conduct a bidirectional packet transmission with the remote Bluetooth device (102) when a Bluetooth packet loss rate of the auxiliary Bluetooth circuit (120) is lower than a Bluetooth packet loss rate of the main Bluetooth circuit (110).

5. The main Bluetooth circuit (110) of claim 4, wherein the auxiliary Bluetooth circuit (120) does not need to ask for a permission from the remote Bluetooth device (102) before replacing the main Bluetooth circuit (110) to conduct the bidirectional packet transmission with the remote Bluetooth device (102).

6. The main Bluetooth circuit (110) of claim 5, wherein during a period in which the auxiliary Bluetooth circuit (120) replaces the main Bluetooth circuit (110) to conduct the bidirectional packet transmission with the remote Bluetooth device (102), the control circuit (115) utilizes the Bluetooth communication circuit (111) to sniff packets issued from the remote Bluetooth device (102).

7. The main Bluetooth circuit (110) of claim 2, wherein the auxiliary Bluetooth circuit (120) is further arranged to operably replace the main Bluetooth circuit (110) to conduct a bidirectional packet transmission with the remote Bluetooth device (102) when the main Bluetooth circuit (110) is disabled or disappears, so as to avoid the auxiliary Bluetooth circuit (120) from missing packets issued from the remote Bluetooth device (102).

8. A main Bluetooth circuit (110) of a multi-member Bluetooth device (100), wherein the multi-member Bluetooth device (100) is utilized for communicating data with a remote Bluetooth device (102) and comprises the main Bluetooth circuit (110) and an auxiliary Bluetooth circuit (120), the main Bluetooth circuit (110) comprising:

a Bluetooth communication circuit (111);

a data transmission circuit (113);

a control circuit (115) arranged to operably conduct a bidirectional packet transmission with the remote Bluetooth device (102) through the Bluetooth communication circuit (111) by utilizing a Bluetooth wireless transmission approach, and arranged to operably communicate data with other devices through the data transmission circuit (113); and a determining circuit (117) coupled with the control circuit (115) and the data transmission circuit (113), and arranged to operably evaluate a computing loading of the main Bluetooth circuit (110) or a temperature of the main Bluetooth circuit (110), and further arranged to operably receive indication messages regarding a computing loading or a temperature of the auxiliary Bluetooth circuit (120) transmitted from the auxiliary Bluetooth circuit (120);

wherein the control circuit (115) instructs the auxiliary Bluetooth circuit (120) to replace the main Bluetooth circuit (110) for conducting the bidirectional packet transmission with the remote Bluetooth device (102) when the computing loading of the main Bluetooth circuit (110) exceeds the computing loading of the auxiliary Bluetooth circuit (120) for a predetermined degree or the temperature of the main Bluetooth circuit (110) exceeds the temperature of the auxiliary Bluetooth circuit (120) for a predetermined degree;

wherein when the Bluetooth communication circuit (111) conducts the bidirectional packet transmission with the remote Bluetooth device (102), the auxiliary Bluetooth circuit (120) sniffs packets issued from the remote Bluetooth device (102); and when the control circuit (115) has detected that the auxiliary Bluetooth circuit (120) has missed packets issued from the remote Bluetooth device (102), the control circuit (115) is further arranged to operably transmit missing packets of the auxiliary Bluetooth circuit (120) to the auxiliary Bluetooth circuit (120) through the data transmission circuit (113).

9. The main Bluetooth circuit (110) of claim 8, wherein during a period in which the Bluetooth communication circuit (111) conducts a bidirectional packet transmission with the remote Bluetooth device (102), the auxiliary Bluetooth circuit (120) does not conduct a bidirectional packet transmission with the remote Bluetooth device (102); while during a period in which the auxiliary Bluetooth circuit (120) conducts a bidirectional packet transmission with the remote Bluetooth device (102), the Bluetooth communication circuit (111) does not conduct a bidirectional packet transmission with the remote Bluetooth device (102).

* * * * *